(12) United States Patent
Donohoe

(10) Patent No.: US 7,698,851 B1
(45) Date of Patent: Apr. 20, 2010

(54) FISHING ROD WITH ELASTIC SLING BAIT LAUNCHER

(76) Inventor: David G. Donohoe, P.O. Box 1165, Springville, CA (US) 93265

( * ) Notice: Subject to any disclaimer, the term of this patent is extended or adjusted under 35 U.S.C. 154(b) by 1036 days.

(21) Appl. No.: 11/338,373

(22) Filed: Jan. 24, 2006

(51) Int. Cl.
*A01K 91/02* (2006.01)
(52) U.S. Cl. ............................................. 43/19
(58) Field of Classification Search ............. 43/19, 43/4.5; 124/16, 17, 21, 24.1, 20.1
See application file for complete search history.

(56) References Cited

U.S. PATENT DOCUMENTS

| 513,590 | A | * | 1/1894 | Morris | 124/27 |
| 2,808,043 | A | * | 10/1957 | Lombard | 43/19 |
| 2,836,920 | A | * | 6/1958 | Sabara | 43/19 |
| 3,143,823 | A | * | 8/1964 | Brown et al. | 43/19 |
| 3,172,226 | A | * | 3/1965 | Andis | 43/19 |
| 4,014,126 | A | * | 3/1977 | Samuels et al. | 43/19 |
| 4,127,956 | A | * | 12/1978 | Hertkorn | 43/19 |
| 5,363,584 | A | * | 11/1994 | Lo | 43/19 |
| 5,493,807 | A | * | 2/1996 | Sullins | 43/19 |
| 5,735,074 | A | * | 4/1998 | Stauffer | 43/19 |
| 6,256,925 | B1 | * | 7/2001 | Blackburn | 43/57.1 |
| 2005/0050788 | A1 | * | 3/2005 | Cahill | 43/19 |

* cited by examiner

*Primary Examiner*—Kimberly S Smith
(74) *Attorney, Agent, or Firm*—William L. Chapin

(57) ABSTRACT

A fishing rod with elastic sling bait launcher utilizes potential energy stored in a pre-tensioned elastic cord to propel a fishing lure or bait attached to one end of a fishing line forward from the rod tip without requiring casting motion of the rod, the other end of the line unwinding from a reel attached to said handle. The sling launcher includes a U-shaped yoke which is secured to the rod shaft at adjustable distances forward of the handle and reel. The elastic sling has an elastic member consisting of an elongated length of elastic cord or a tension spring attached at opposite ends thereof to upper ends of a pair of laterally opposed, upwardly protruding yoke arms. A generally flat, horizontally disposed bait launcher plate attached to the center of the elastic member is pulled rearward to tension parallel segments of the elastic member, and is engaged with a pivotable bait launching mechanism by an anchor pin protruding upwards from a forward end of an anchor bar secured to the rod handle, which protrudes upwardly through apertures provided through a base plate of the bait launching mechanism, and a bait launcher tray support on top of the bait launcher base plate, and through an anchor hole through the bait launcher plate. A bait and attached line are pulled rearwards from the tip of the rod shaft towards the bait launcher plate, thus pulling line from a reel located on the underside of the rod handle, and through a plurality of line guide eyes located on the underside of the rod shaft. A bait hook is positioned in a groove provided in a front edge wall of the bait launcher plate, with the bait and attached line arranged in a rearwardly directed half loop on the upper surface of the bait launcher support tray. A rearwardly protruding trigger plate of the pivotable bait launcher mechanism rocker arm is depressed by a fisherman's thumb to launch a bait, thus pushing the bait launcher plate upwardly off an engagement with the anchor pin and thereby enabling tension in the sling to propel the bait and attached line forward.

31 Claims, 12 Drawing Sheets

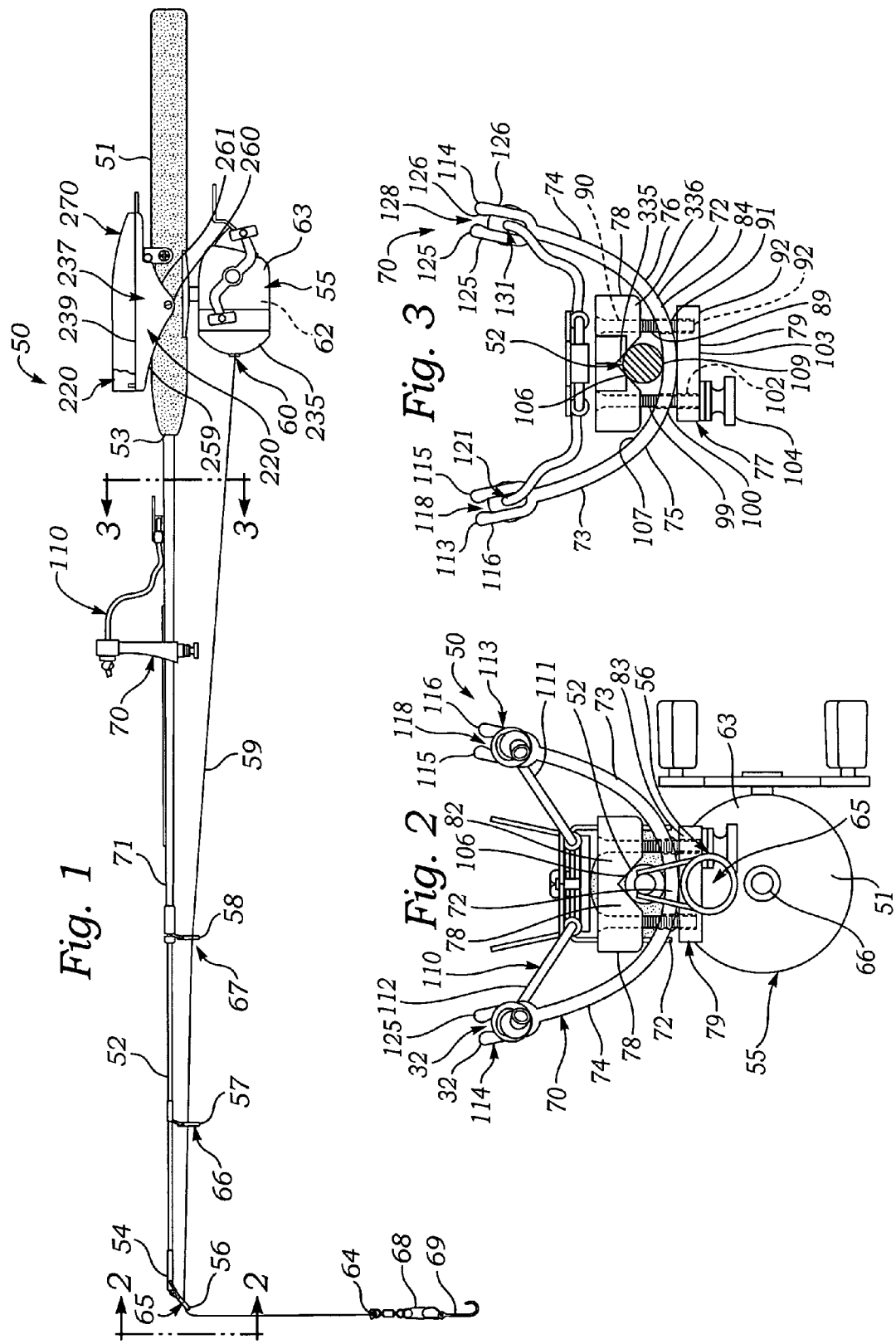

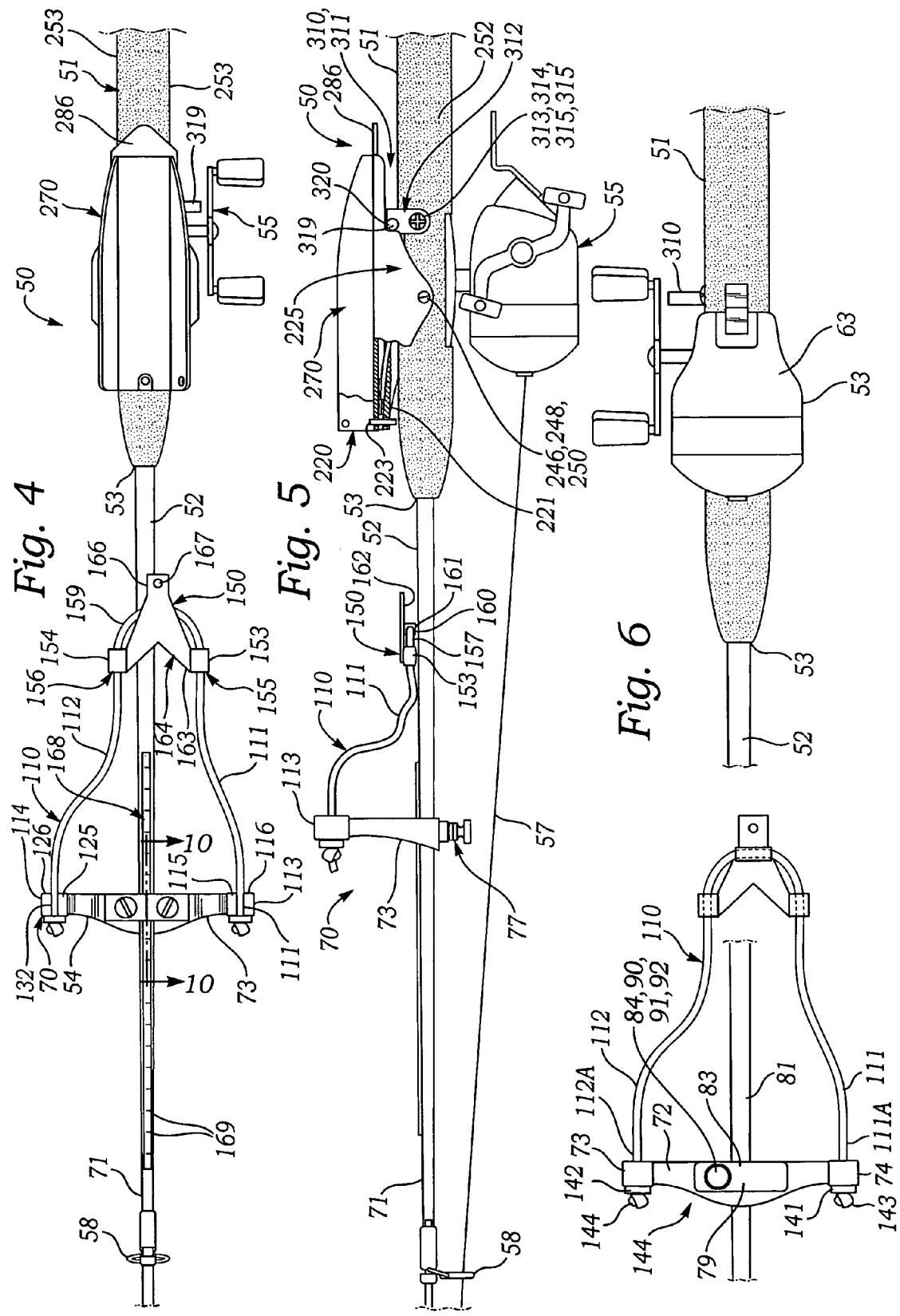

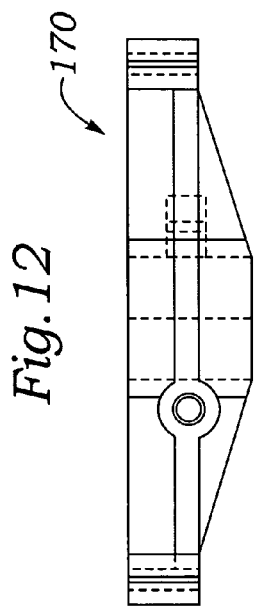
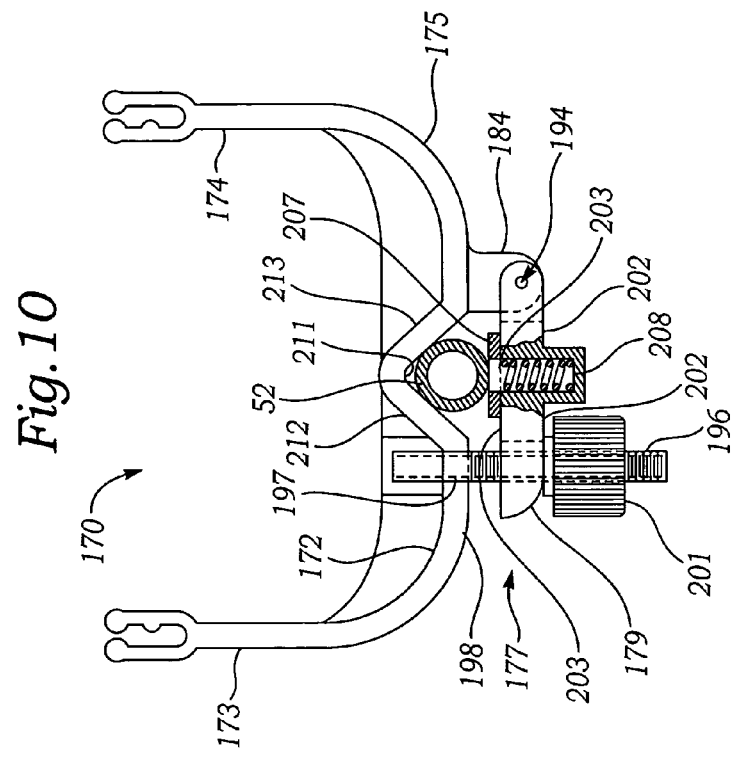
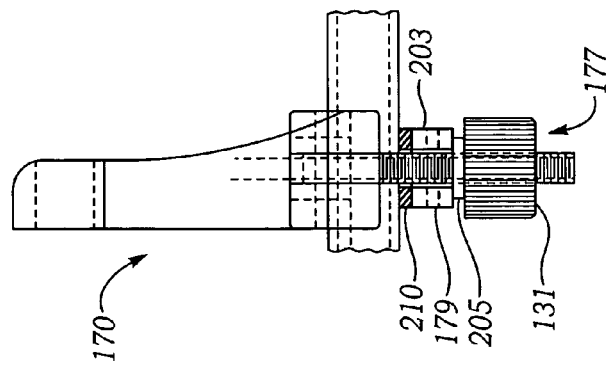

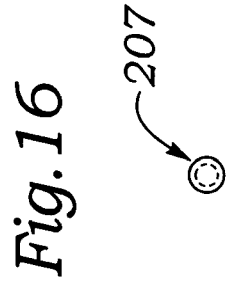
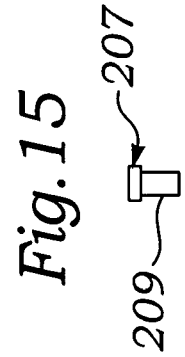
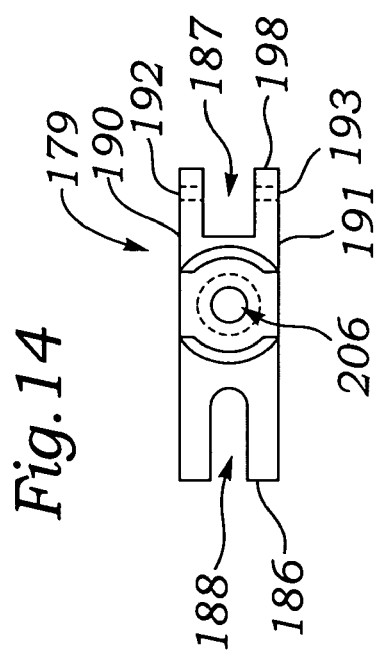
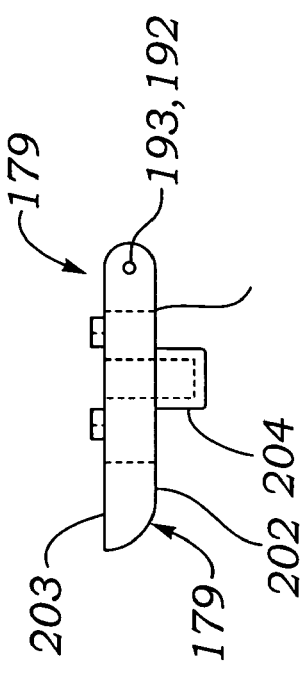

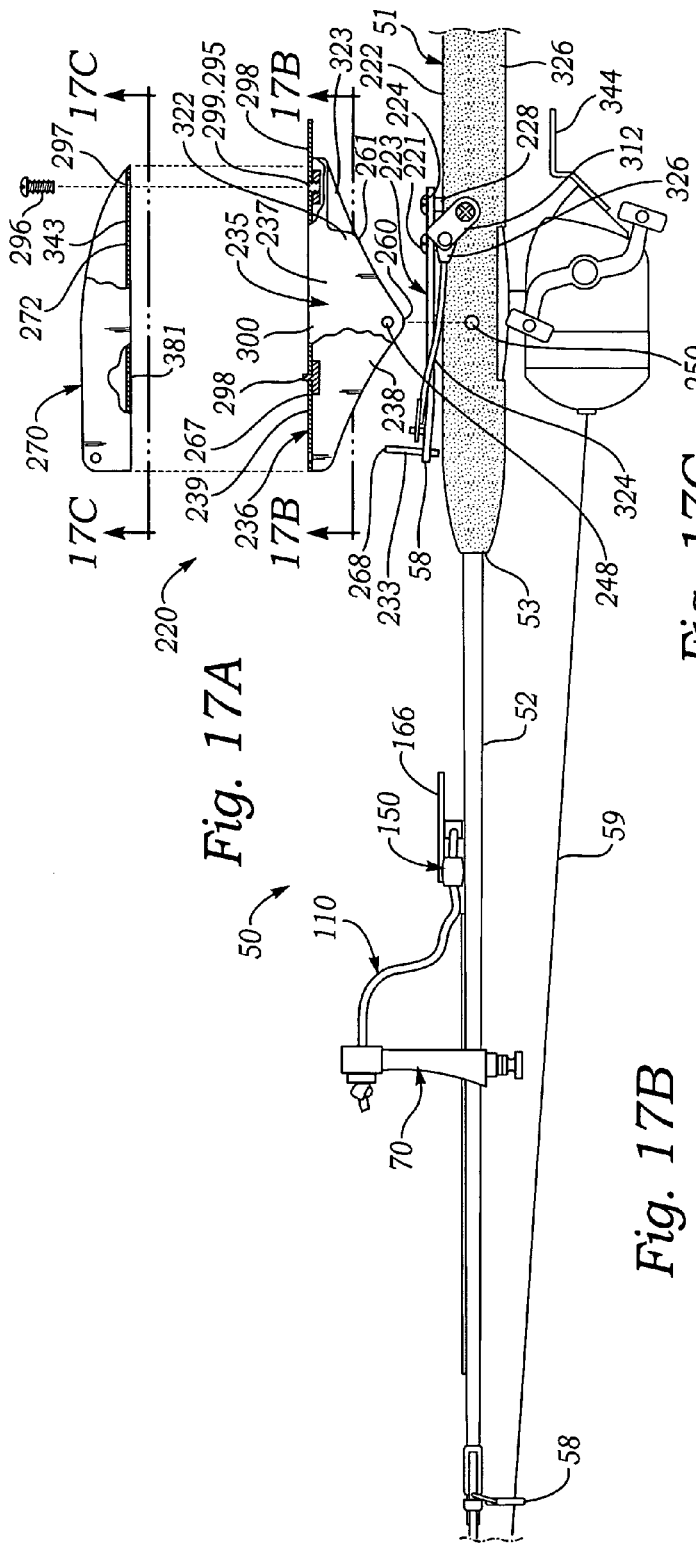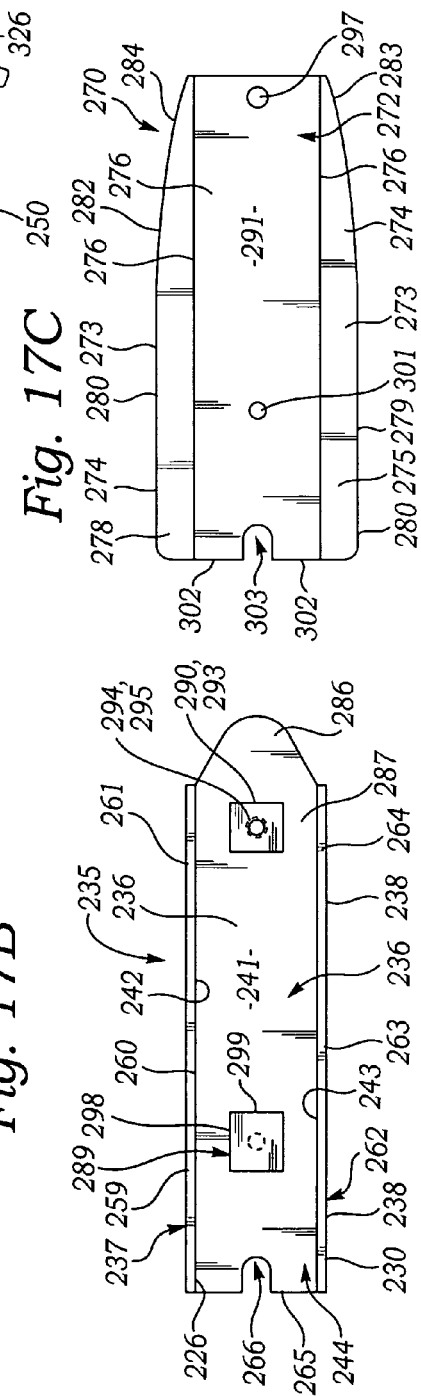

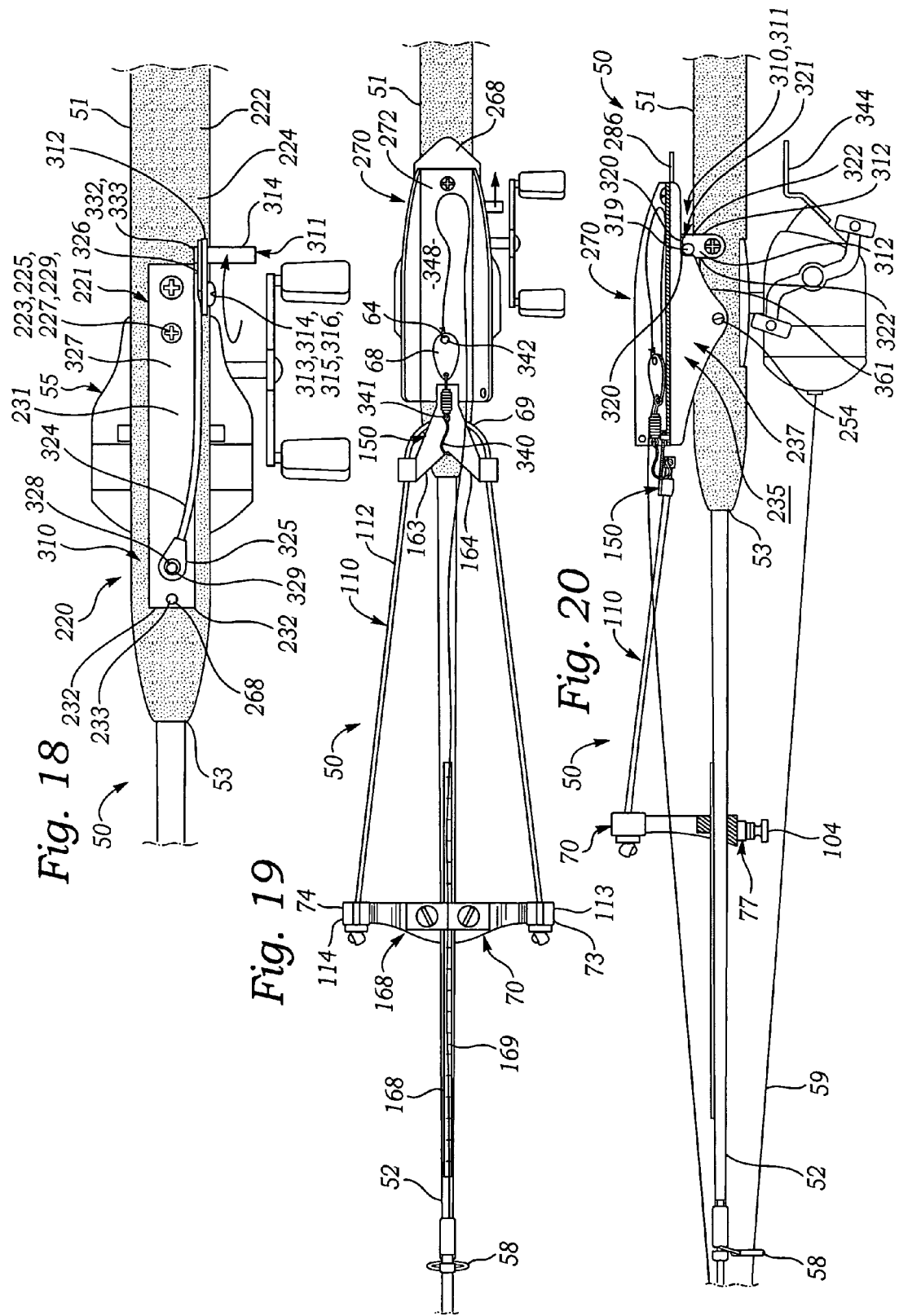

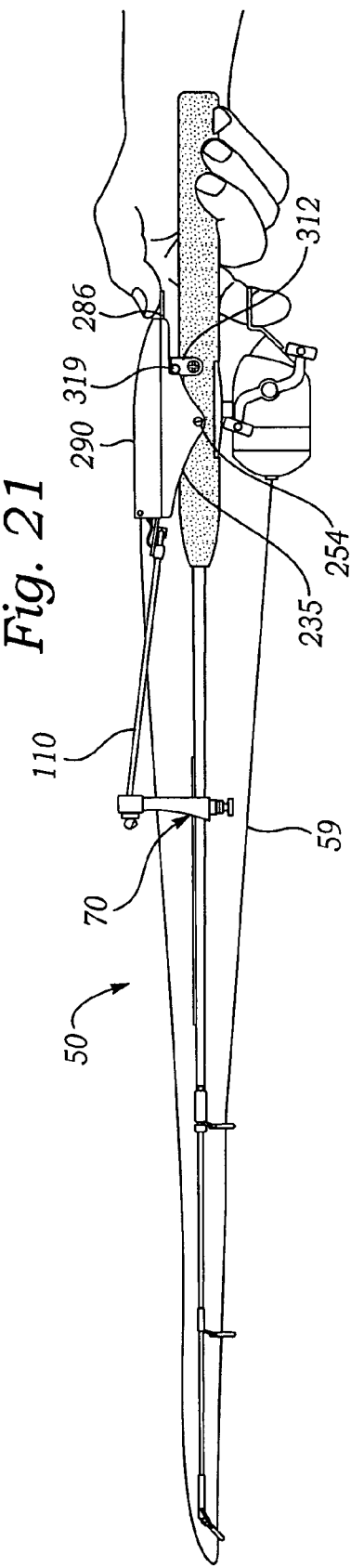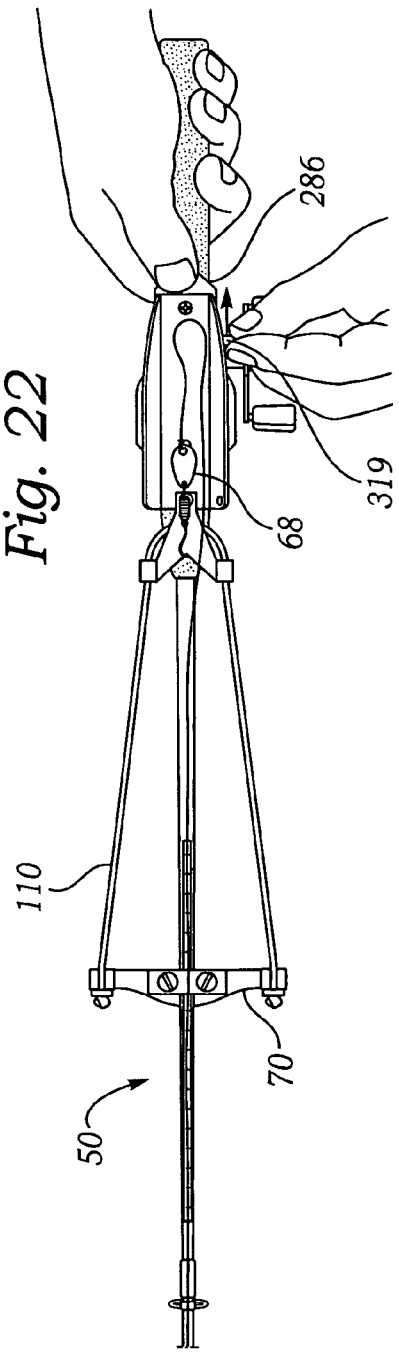

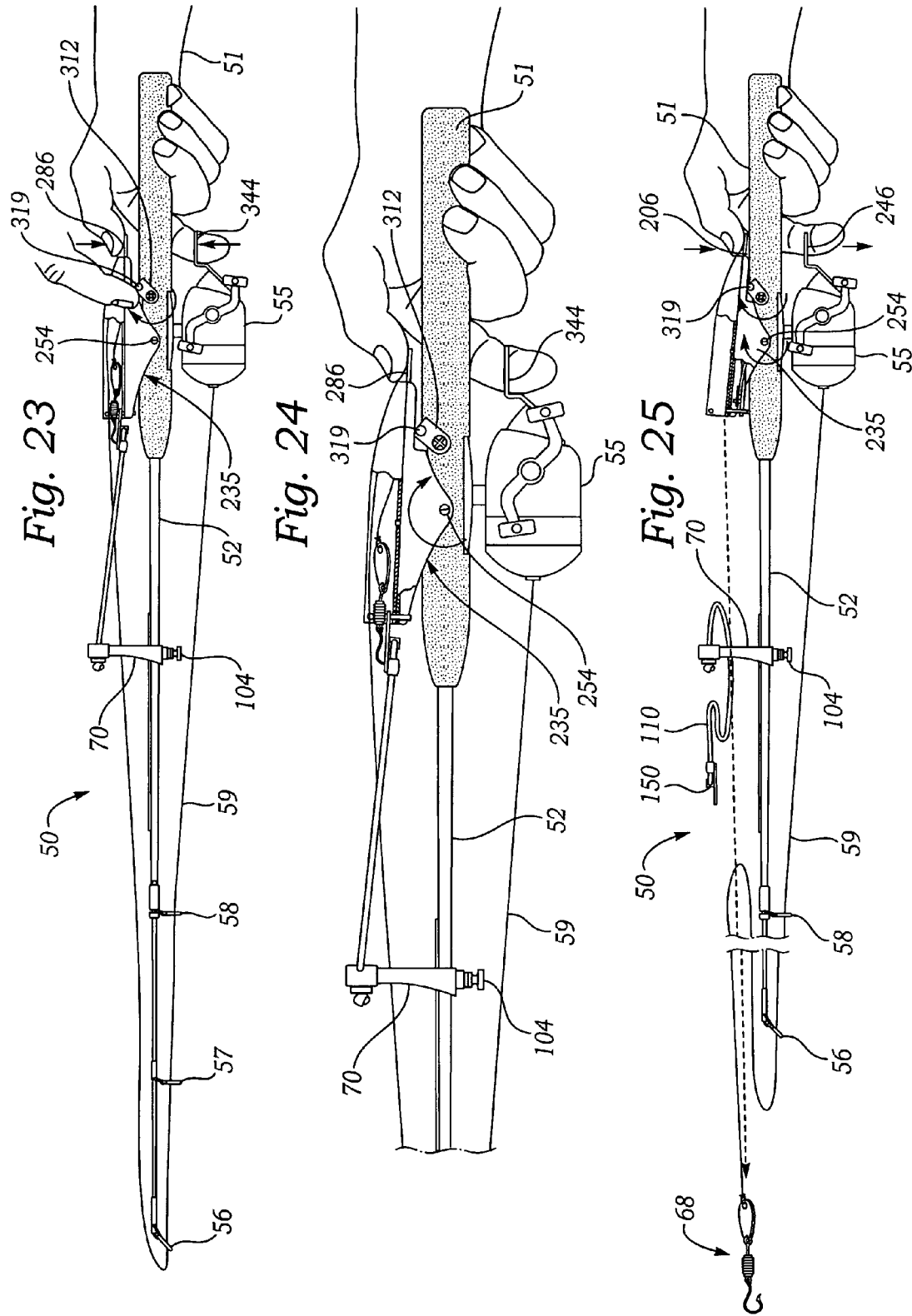

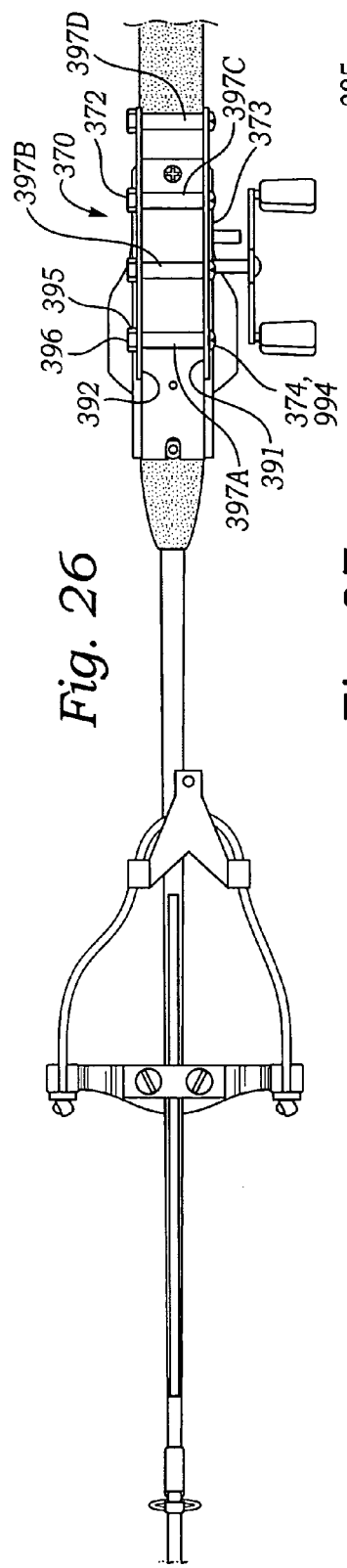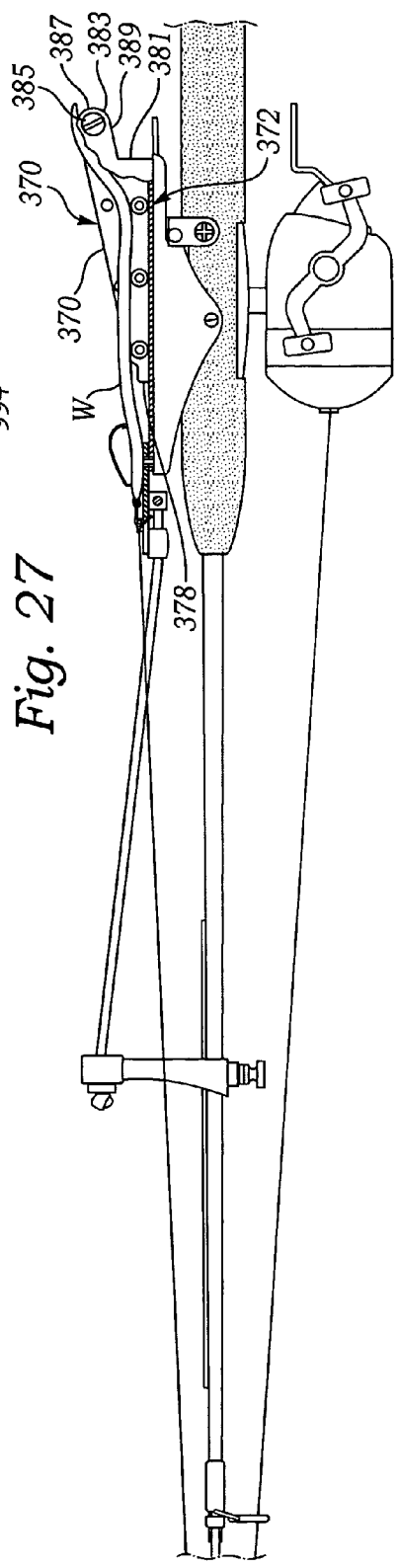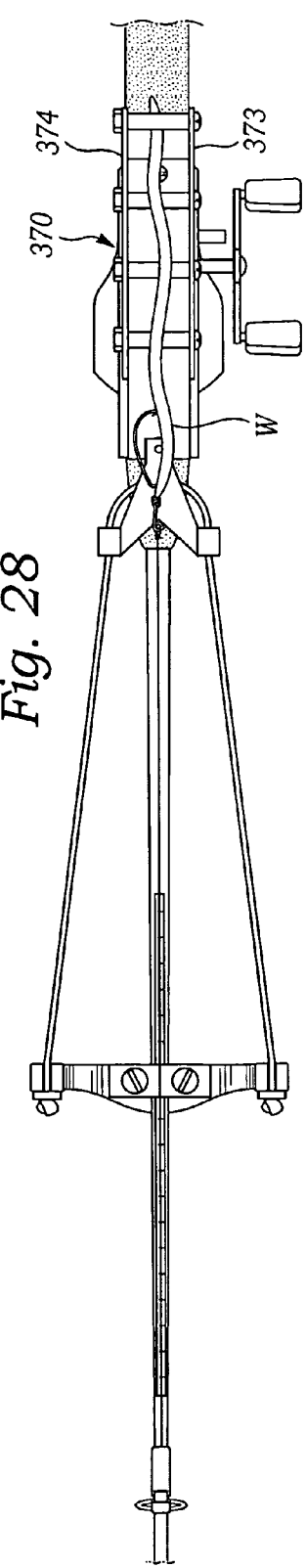

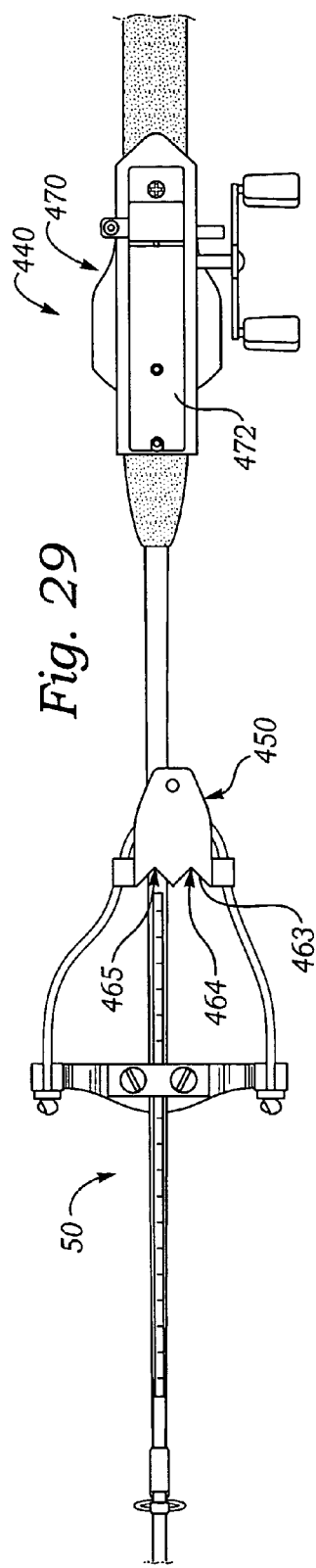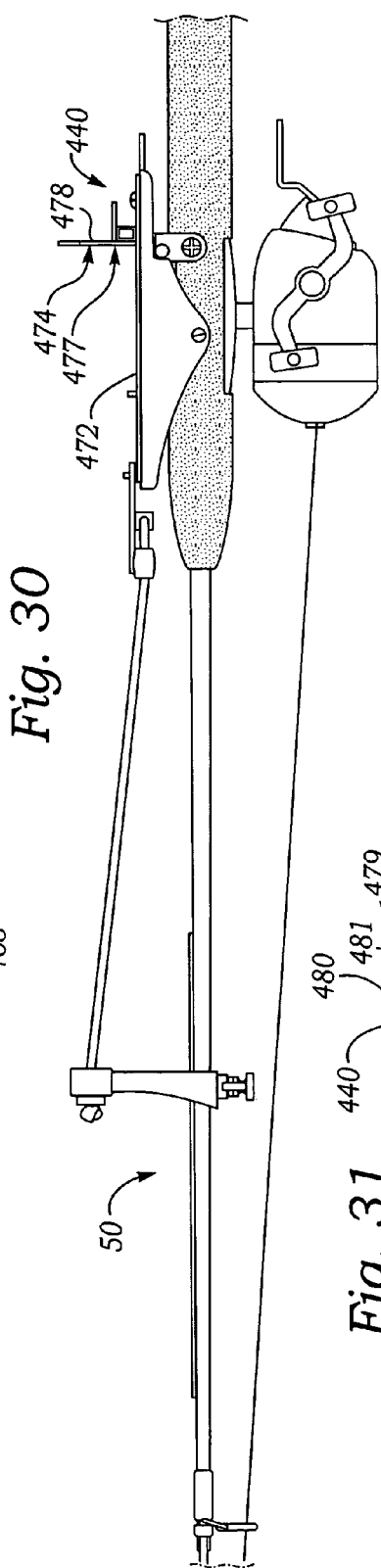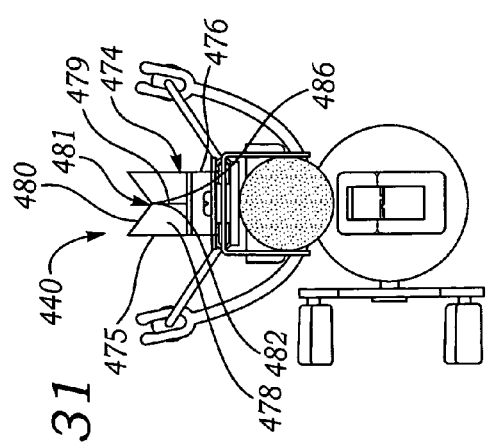

FISHING ROD WITH ELASTIC SLING BAIT LAUNCHER

BACKGROUND OF THE INVENTION

A. Field of the Invention

The present invention relates to fishing rods of the type used by sportsmen and commercial fishermen to catch fish by a hook-and-line method, i.e., by using a bait and hook attached to a line payed out from a reel through line guides attached to an elongated flexible rod. More particularly, the invention relates to a fishing rod which uses potential energy stored in a tensioned elastic sling attached to the rod, to propel a bait attached to the end of a fishing line to accurately controllable distances and directions, while retaining the rod motionless.

B. Description of Background Art

Most sport fishing and some commercial fishing uses a hook-and-line catch method, in which an artificial or natural lure or bait with an attached hook is fastened at one end of fine, strong line. The other end of the line is usually attached to a fishing rod which has an elongated flexible shaft, and is most often wound onto a rotatable spool of a fishing reel. The reel is provided with a handle attached to the spool, which rotates as a bait on the distal end of the line is payed out through ring-shaped line guide eyes located along the length of the rod shaft, to position the lure at a desired lateral distance and depth relative to a fisherman located in a boat, or on a shore adjacent to a body of water such as an ocean, lake or stream. Rotating the reel handle winds the line back onto the reel spool, to reel in a fish which has been hooked by the bait, or to retrieve and reposition the bait at a different location.

A customary way of positioning a bait at a desired location in a body of water is to reel in the line sufficiently to position a bait attached to the line just beyond a tip guide eye which angles forward from the tip of the fishing rod shaft. The fisherman, holding the rod by grasping a handle located rearward of the reel, then draws the tip of the shaft and attached bait rearwards towards his body in a sweeping arc-shaped back swing. The shaft is then snapped forward from the fisherman's body in a quick, vigorous arc-shaped casting motion, typically in a horizontal or vertical plane. At the end of the arc-shaped casting motion, momentum thus imparted to the bait or lure causes it to continue to move forward after forward motion of the rod tip has ceased, causing the bait to be propelled forwards from the rod tip and dragging the attached line with it, the line paying out from the reel through guides attached to the rod, and unwinding from the reel spool, which has been unlocked by the fisherman during the cast.

Although casting a bait or lure in the manner descried above is a relatively simple task, it requires some degree of skill and practice for a person to be able to consistently position a bait at a selected splash point in the water, sometimes at a substantial distance away from the fisherman. Moreover, when casting is done from a boat with other people present, or on a crowded shore, care must be taken that the hooked bait or lure is not propelled into another person, or another person's fishing line. Also, there are situations in which even an experienced fisherman finds conventional bait casting techniques inadequate. For example, when fishing in a heavily wooded area adjacent to a stream or lake, foliage can sometimes be so thick as to make normal arc-shaped casting motions of a fishing rod difficult if not impossible. Accordingly, it would be desirable to have a fishing rod which enables a bait or lure to be propelled from a fishing rod without requiring a casting motion of the rod, for use in such locations as described above, which have limited overhead and/or lateral clearance for casting motions of a fishing rod.

In recognition of problems associated with utilizing conventional arc-shaped casting motions of a fishing rod to cast fishing lures, there have been previous efforts to provide devices which might enable casting of baits or lures without requiring motion of a fishing rod. Prior art references known to the present inventor which are intended to propel fishing lures or baits without requiring conventional casting motions of a fishing rod include the following United States patents: U.S. Pat. No. 2,217,820, Rowe; U.S. Pat. No. 2,225,719, Shattor, U.S. Pat. No. 3,015,102; Tuttle et al., U.S. Pat. No. 3,962,813, Moon.

The foregoing references disclose compressed springs or compressed gas to propel baits from a rod. Hertkorn, U.S. Pat. No. 4,127,956 discloses a sling-shot type bait launching device which employs an elastic cord that is stretched rearwards from a U-shaped yoke protruding from the top of a fishing rod. The cord is attached to the rear end of a bait launching cup, which is releasable by a pistol-like trigger to thereby enable the cord to propel the bait cup and a bait within the cup.

The present invention was conceived of to provide a fishing rod of practical and versatile design which uses a stored energy source to accurately propel a wide variety of types of fishing baits and lures for substantially long distances and with substantial accuracy, without requiring a casting motion of the rod.

OBJECTS OF THE INVENTION

An object of the present invention is to provide a fishing rod that uses a source of stored potential energy to launch a bait or lure attached to one end of a fishing line, the other end of the line being attached to a reel mounted onto the rod.

Another object of the invention is to provide a fishing rod which utilizes a tensioned elastic sling to launch a bait or lure from the rod.

Another object of the invention is to provide a fishing rod which utilizes a tensioned elastic cord that is attached at a front end thereof to a U-shaped support yoke which protrudes upwardly from the rod, the cord having attached to a rear end thereof a notched launching plate for engaging a hook of a bait or lure, or a launching clip attached to a leader trailing a bait or lure.

Another object of the invention is to provide a fishing rod which utilizes tensioned elastic cord that is stretched rearwards from an upstanding launching sling yoke, the rear end of the cord having attached thereto a notched launch plate having a V-shaped groove or notch for engaging a bait hook or launch clip attached through a leader to a bait, the launch plate being releasably engaged with a launch platform member movable by thumb pressure to disengage with the launch plate and thereby enable the released elastic cord to propel the launch plate and attached bait forward.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a fishing rod which includes a source of stored energy to propel a fishing bait or lure from the rod, without requiring motion of the rod. More particularly, the invention comprehends a fishing rod which uses potential energy stored in an elastic sling cord which is stretched rearwards and subsequently released by a trigger mechanism to propel a bait and attached line forwards from the rod.

A fishing rod with elastic sling bait launcher according to the present invention includes an elongated, generally cylindrically-shaped rear handle, a reel mounted to the underside of a forward portion of the handle, and an elongated, flexible shaft which protrudes forward from the handle. Preferably, the pole has a generally uniform cross-sectional shape, e.g., circular or hexagonal, and tapers to a diameter at the outer end or tip of the shaft which is smaller than the diameter of the base or butt end of the shaft at the location where the shaft protrudes from the handle.

The shaft portion of the fishing rod with elastic sling bait launcher according to the present invention is provided with a plurality of annular ring-shaped fishing line guide eyes which protrude downwardly from a lower surface of the shaft. The guide eyes slidably receive therethrough a fishing line which is wound on an internal spool within the handle-mounted reel, which is preferably of a type referred to as a spinning reel. The eye guides, or simply eyes, for the fishing line include a front, end or tip guide located at the outer or distal end of the pole, and two or more additional eye guides which have central apertures approximately longitudinally aligned with a central aperture of the tip guide eye, the additional guides being spaced apart at approximately equal intervals longitudinally rearwards of the tip guide.

The fishing rod with elastic sling bait launcher according to the present invention includes a U-shaped sling support yoke with protrudes upwardly from the upper surface of a rear portion of the rod shaft, the yoke having laterally spaced apart, vertically upwardly protruding left and right arms which are spaced equal lateral distances from the longitudinal center line of the shaft. The yoke is located longitudinally between the rearmost eye guide and the front end of the handle and is slidable along the shaft within the opening of a loosened yoke clamp to a selected position indicated by a selected distance marker index of an indicia scale imprinted on the upper surface of the shaft. The yoke is secured tightly to the shaft at the desired longitudinal position by tightening a knurled thumb knob which protrudes downwards from the yoke clamp, the tightening of the thumb knob compressing clamp jaws tightly onto the shaft.

According to the present invention, the fishing rod with elastic sling bait launcher has an elastic cord which has enlarged ends, e.g., knots, at opposite ends thereof secured in slots which extend downwards into upper ends of the left and right yoke arms. Opposed segments of the elastic cord protrude rearwardly from the yoke arms to form a limp, arcuately curved half loop.

The elastic bait launch sling according to the present invention includes a flat, horizontally disposed Y-shaped launching plate which has two laterally opposed front, parallel, longitudinally disposed left and right attachment ferrules which receive through and are secured to right and left segments of the elastic cord half loop. The launching plate has located in a forward edge wall thereof a symmetrically located, rearwardly protruding V-shaped hook notch for engaging the bend of a bait hook or launch clip. Also, the launching plate has a rear anchor tab consisting of a generally rectangularly-shaped base leg which protrudes rearwardly from the front, notched portion of the launching plate. The anchor tab is located laterally symmetrically with respect to the front attachment ferrules of the launching plate. A rear portion of the anchor tab has through its thickness dimension a vertically disposed circular cross-section anchor-pin engagement hole.

The fishing rod with elastic sling back launcher according to the present invention also includes a bait launching mechanism attached to an upper side of the rod handle, rearwards from the sling support yoke. The bait launching mechanism includes a vertically disposed anchor pin for engaging the anchor pin hole in the rear anchor tab of the launching plate. The anchor pin protrudes vertically upwards from the front end of a longitudinally elongated, rectangularly-shaped launching mechanism anchor bar which is fixedly secured to the upper surface of the rod handle.

The bait launching mechanism includes a bait support rocker platform, which has a longitudinally elongated, generally rectangularly-shaped flat upper base plate. The base plate has a front laterally disposed straight edge which is approximately aligned with a front lateral edge of the launching mechanism anchor bar. The base plate of the bait support rocker platform is longer than the anchor bar which it overlies, and has an ogival-shaped, rearwardly extending rear end portion which serves as a thumb-operable trigger plate as will be explained below.

The bait support rocker platform has depending perpendicularly downwardly from opposite left and right longitudinally disposed side edges of the upper base plate of the rocker platform a pair of left and right side flange plates, which form between inner facing vertical wall surfaces thereof, and with a lower, inner wall surface of the upper base plate, an inverted, generally rectangularly-shaped channel.

Each side flange plate of the rocker platform has in side elevation view a shape approximating that of an inverted isosceles triangle whose base corresponds to an upper longitudinally disposed edge of the side plate. The width of the inverted channel formed between the upper base plate and side plates of the bait launcher rocker platform is greater than the width of the rod handle and the anchor bar attached to the upper surface of the handle. Also, the side flange plates of the bait launcher rocker platform are pivotably fastened to opposite lateral sides of the rod handle by a pair of opposed, transversely aligned bushings which protrude laterally outwards from opposite sides of the handle and receive therethrough a rocker arm pivot axle screw. The latter is disposed laterally inwards through a pair of laterally aligned pivot axle holes which extend perpendicularly through the flange plate, near the lower, vertex ends of the flange plates. This construction enables the bait launcher rocker platform to be pivoted up and down with respect to the longitudinal axis of the rod handle, and therefore with respect to the anchor bar which the rocker platform overlies.

The front laterally disposed edge of the bait launcher rocker platform has cut rearwards therein a laterally centrally located, U-shaped notch, which receives upwardly therethrough the anchor pin which protrudes upwardly from a front end of the anchor bar. With this construction, a tensioned elastic sling cord is held in a rearwardly stretched position by vertically aligning the anchor pin hole through the launching plate tab with the anchor pin and pushing the tab downwards so that anchor pin is insertably received through the anchor pin hole of the launching plate anchor tab. When the trigger plate protruding rearwardly from the rocker platform is depressed, by a thumb, that portion of the rocker platform rearward of the rocker pivot axle pivots downwardly, causing the front, notched edge wall of the rocker platform to pivot upwardly. Upward pivotal motion of the front edge of the rocker platform in turn causes a front portion of the upper base plate of the rocker arm to push upwardly on the lower surface of the rear anchor tab of the sling launcher plate, thus pushing the launcher plate anchor tab upwards off of the anchor pin. This action releases the anchor tab, thereby enabling the elastic energy stored in the rearwardly tensioned sling cord to propel the cord and launching plate forward with substantial force.

In a basic mode of operation of the fishing rod with elastic sling bait launcher according to the present invention, an attachment eye located at a front end of a bait is attached to the free end of a fishing line which has been payed out from a reel attached to the lower side of the handle and passed through the line guides on the lower side of the rod shaft, after the spool locking release lever of the reel has been actuated. The line is pulled out through the tip line guide on the lower side of the rod, and looped backwards over the upper side of the rod shaft to position the bait on the upper base plate of the rocker platform. The bend of a barbed fish hook trailing from the bait is then positioned in the V-shaped groove in the front edge of the bait launcher plate, which is held in a tensioned, armed position by the rocker arm anchor pin. Thus, when the rear trigger plate of the rocker platform is depressed, the front end of the rocker platform pivots upwardly and thereby pushes the launcher plate upwards off of the anchor pin, thereby releasing the launcher plate to be snapped vigorously forward by the elastic sling.

Forward motion of the launching plate attached to the elastic sling cord drags the bait hook and attached line forwards over the sling yoke. When forward motion of the elastic cord and launcher plate is ended by rearward tension of the sling on the launcher plate after it has traveled forwards from the yoke, forward momentum imparted to the bait hooked onto the launcher plate causes the bait to continue to move forward. Forward motion of the bait relative to the restrained launching plate causes the bait hook to disengage from the V-groove in the front edge of the launching plate, enabling the bait to travel forwards a substantial distance beyond the tip of the rod, along with the attached line.

In a preferred embodiment, the rod handle is grasped between the palm and outer three fingers of a person's hand, while the thumb is used to depress the launch release trigger plate. Also in the preferred embodiment, the line reel is provided with a spool locking release lever which protrudes rearwardly from the reel, below the rod handle, where it is conveniently squeezable by the forefinger before or simultaneously with depression of the launch release trigger by the thumb, to thereby enable line pulled forward with the launched bait to be freely un-spooled from the reel.

A preferred embodiment of the fishing rod with elastic sling bait launcher according to the present invention includes a safety lock switch which requires use of both hands of a user to trigger a launch. A basic embodiment of a safety switch includes a pivotable arm which is attached to a left side of the rod handle, forwards of the trigger plate of the rocker arm. The arm has a laterally outwardly protruding locking pin, which is received in a rectangularly-shaped notch cut in the rear diagonal edge of a side cover plate, e.g., the left side cover plate.

The safety switch pivot arm is resiliently biased, as for example, by an elastic cord or tension spring, to a forward position, in which the laterally outwardly protruding safety switch locking pin forcibly engages the intersection between horizontal and vertical edges of the rocker arm side wall notch, thus preventing pivotable launching motion of the rocker arm. Therefore, to pivot the rocker arm clockwise to release the sling and bait by depressing the trigger plate with the right thumb, the safety switch locking arm must simultaneously be pivoted clockwise to an unlocked position by grasping the locking pin between the thumb and forefinger of the left hand, and pivoting the locking arm rearwards against the resilient counterclockwise biasing force.

Preferably, the fishing rod with elastic sling bait launcher according to the present invention includes a bait launch support tray which is attached to the upper surface of the rocker platform upper base plate. The bait launch support tray is provided for receiving and supporting in position a bait and a length of loose fishing line which is attached to the rearwardly oriented front attachment eye of the bait, when the bend of a hook attached to the bait is engaged with the V-shaped groove in the front edge of the launcher plate. The bait launch support tray is also used to support various bait components and fittings such as leaders, swivels and snaps.

A basic embodiment of a bait launch support tray according to the present invention includes a trough-shaped structure which has a flat, longitudinally elongated rectangular base plate that is attached conformally to the upper surface of the upper base plate of the rocker platform. The tray has a pair of opposed left and right longitudinally disposed side wings which protrude upwardly from left and right longitudinally disposed edges of the tray base, preferably angled outwardly. The front portions of the side wings preferably have a rectangular shape, with horizontally oriented, longitudinally rearwardly disposed upper edge walls. Preferably, upper edges of rear ends of the side wings curve arcuately downwards to join the rear transverse edge of the bait tray base wall, to thereby provide clearance for a thumb used to depress the rocker arm trigger plate, which protrudes rearwardly of the rear transverse edge of the bait launch support tray base plate.

The fishing rod with elastic sling bait launcher according to the present invention is optionally provided with bait launch support trays of different types, in which case the various trays are constructed to be interchangeably mountable on the upper surface of the upper base plate of the rocker platform, as by a pair of longitudinally spaced apart screws, or a screw and longitudinally spaced apart locating pin which protrudes upwardly from the upper surface of the upper base plate of the rocker platform and received through a hole provided through the base plate of the bait tray. The present inventor has found that launching soft, flexible artificial baits which are made of a synthetic polymer that contains a large percentage of a plasticizer is problematic, for the following reason. The high percentage of plasticizer in artificial worms and similar baits causes the bait to adhere relatively firmly to surfaces such as those of the bait tray base plate, to the extent that it is impractical to rapidly launch a bait from such a surface. For such baits with a high degree of surface static friction, adhesion or "stiction," the present inventor has discovered that a practical way to overcome the launching problems is to utilize a roller bait launch support tray of novel design.

The roller bait launch support tray according to the present invention includes a longitudinally elongated rectangular base plate releasably attachable to the rocker platform base plate in parallel overlying contact with the upper surface of the rocker platform base plate. The roller bait launch support tray base plate has protruding upwardly from opposite longitudinally disposed sides thereof parallel, vertically disposed left and right side panels. The side panels have in side elevation view a wedge-like outline shape which has a short front edge wall and a straight upper edge wall that is disposed obliquely upwards to a higher rear edge wall. The side panels have disposed transversely between inner facing parallel vertical surfaces thereof a plurality of longitudinally spaced apart, cylindrically-shaped plastic rollers, each of which is freely rotatable around a transversely disposed axle bolt. The rollers preferably include a plurality, e.g., three of lower transversely disposed rollers which are located in parallel longitudinal alignment close to the base plate of the roller launcher tray, and at least one upper rear roller disposed transversely between the upper rear corners of the bait launch support tray side panels.

The fishing rod with elastic sling bait launcher according to the present invention also optionally includes a dual bait launch accessory including a modified launching plate and a modified dual bait launch tray for launching bait configurations which have two components, such as a hooked bait attached to the end of the line, and a sinker attached to the line at some distance forward of the end of the line.

The modified launching plate of a dual bait launch accessory is attached at opposite longitudinally disposed sides thereof to parallel segments of a looped elastic sling cord, in the same manner as the basic embodiment of the launch plate. However, the modified dual launch plate has a more generally rectangular shape, and has formed in the front edge wall thereof a pair of left and right V-shaped grooves which are spaced equidistant from a longitudinal center line of the launch plate.

The bait launch support tray of the dual bait launch accessory includes a longitudinally elongated, rectangularly-shaped base plate which is attached in conformal overflying relation to the upper base plate of the rocker, as by one or more removable screws.

The dual bait launch support tray has protruding upwardly from the upper surface thereof a thin, transversely disposed line holder plate. The latter is made of a resilient material such as rubber and has a generally rectangular outline shape in front and rear elevation views. A thin, laterally centrally located vertically disposed slit is cut perpendicularly downwards into the line holder plate, from a horizontal upper edge wall thereof. The slit is adapted to receive and resiliently but loosely hold a looped length of fishing line or leader which is oriented perpendicularly to the line holder plate and pulled downwards into frictional engagement with opposed slit walls. Preferably, the upper edge wall of the line holder plate has formed therein a V-shaped notch whose vertex terminates at the upper end of the slit opening. The notch serves as an aid to a fisherman in guiding a line or leader into the slit.

The dual launch accessory is used by engaging the bend of a bait hook in one of the two V-shaped launching plates grooves, and a clip attached to a weight such as a clip shot within the other grooves. A length of line or leader between the bait eye and the weight is then drawn rearwards into a half loop, and the half loop pulled down into line holder groove. With this arrangement, when the launcher plate is released from the trigger mechanism in the manner described above for operation of the single groove launcher plate, the bait, weight, and interconnected leader or line are all launched forwards simultaneously.

Optionally, the line-holder plate is mounted to the base of the dual launcher plate in a manner which enables the longitudinal position of the line holder plate to be adjusted to accommodate different lengths of line or leader between a bait and weight.

BRIEF DESCRIPTION OF THE DRAWINGS

FIG. 1 is a side elevation view of a "Power Cast Sling Rod" fishing rod with elastic sling bait launcher according to the present invention.

FIG. 2 is a front elevation view of the fishing rod of FIG. 1, on an enlarged scale.

FIG. 3 is a rear vertical sectional view of the rod of FIG. 1, taken in the direction of lie 3-3.

FIG. 4 is a fragmentary upper plan view of the fishing rod of FIG. 1, on an enlarged scale.

FIG. 5 is a fragmentary side elevation view of the rod of FIG. 1, on an enlarged scale.

FIG. 6 is a fragmentary lower plan view of the rod of FIG. 1.

FIG. 10 is a rear elevation view of a modified sling yoke.

FIG. 11 is a side elevation view of the modified sling yoke of FIG. 10.

FIG. 12 is an upper plan views of the modified sling yoke of FIG. 10.

FIG. 13 is a rear elevation view of a pivotable clamp bar of the yoke of FIG. 10.

FIG. 14 is an upper plan view of the clamp bar of FIG. 13.

FIG. 15 is an elevation view of a compression shaft pin of the yoke clamp assembly of FIG. 10.

FIG. 16 is an upper plan view of the compression pin of FIG. 15.

FIG. 17A is an exploded left side elevation view of the triggering mechanism of the rod of FIG. 1.

FIG. 17B is a lower plan view of a rocker platform of the triggering mechanism of FIG. 17A.

FIG. 17C is a lower plan view of a bait launch tray of FIG. 17A.

FIG. 18 is a fragmentary upper plan view of the triggering mechanism of FIG. 17A, showing a safety switch thereof pivotably retracted to an armed release position.

FIG. 19 is a view similar to FIG. 4, but showing the rod configured in an armed and locked position, ready to launch a bait by tensioning an elastic sling thereof in a rearward position in which a launching plate thereof is engaged by a release pin of a trigger mechanism thereof, and showing a hook of a bait engaged by the launching plate.

FIG. 20 is a partly sectional side elevation view of the rod of FIG. 19.

FIG. 21 is a side view of the arrangement of FIGS. 19 and 20, showing the rod being held by one hand of a person with the rod grip grasped between the fingers and palm of one hand, the thumb resting on a trigger plate of the trigger mechanism thereof, and the forefinger in position to squeeze a line release lever of a fishing line reel fastened to the rod.

FIG. 22 is an upper perspective view of the rod configured as in FIG. 21, but showing the thumb of the hand grasping the rod grip depressing the trigger plate, and the thumb and forefinger of an opposite hand grasping a safety arm and pivoting the safety arm rearwards to enable the trigger plate to be depressed and thereby pivot a forward portion of the trigger plate upwardly to disengage the launch plate from a vertical launch post, and thereby enabling the elastic sling to elastically snap forwards, thus propelling the launch plate and attached bait forwards.

FIG. 23 is a partly sectional left side elevation view of the rod configured as shown in FIG. 22.

FIG. 24 is a fragmentary sectional view of the structure of FIG. 23, showing the trigger plate of the trigger mechanism partially depressed by a fisherman's thumb.

FIG. 25 is a side perspective view of the rod of FIG. 24, showing the trigger plate fully depressed to release the elastic sling and allow it to spring forward, thereby propelling the launch plate, hard bait, and fishing line forwards beyond the tip eye of the rod.

FIG. 26 is an upper plan view of a modification of the rod of FIG. 1, in which a trough-shaped hard bait tray is replaced by a roller bait tray for casting soft baits.

FIG. 27 is a partly sectional side elevation view of the rod of FIG. 26.

FIG. 28 is a view similar to that of FIG. 26, but showing a soft bait supported by rollers of the roller bait tray.

FIG. 29 is an upper plan view of another modification of the rod of FIG. 1, showing a single notch sling launcher plate thereof replaced by a double notch launching plate, and a trough bait tray replaced by a split rubber rear bait holder.

FIG. 30 is a side elevation view of the rod of FIG. 29.

FIG. 31 is a rear view of the rod of FIG. 29.

DESCRIPTION OF THE PREFERRED EMBODIMENTS

Figure 9:
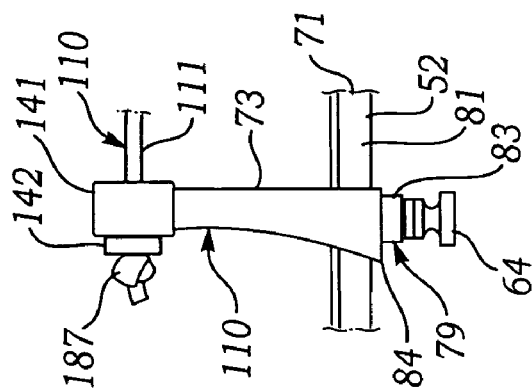
FIG. 9 is a fragmentary side elevation view of the sling yoke of FIG. 7.

FIGS. 1-33 illustrate a fishing rod with elastic sling bait launcher according to the present invention.

Referring first to FIGS. 1-4, it may be seen that a fishing rod 50 with elastic sling bait launcher according to the present invention includes an elongated, generally cylindrically-shaped handle 51 which has an elongated, flexible shaft 52 that protrudes forward coaxially from the front transverse end wall 53 of the handle. Shaft 52 preferably has a symmetric cross-section, such as circular or hexagonal. Preferably, shaft 52 is tapered, having a larger diameter at a rear, base end than at the tip 54 thereof. Shaft 52 is preferably made of lightweight, strong material such as tubular steel, fiberglass, carbon fiber composite or the like, and may be optionally constructed from connected longitudinally arranged sections, which are telescopically disengageable to reduce the maximum dimensions of the rod for packaging and transport.

As shown in FIG. 1, rod 50 includes a fishing line reel 55 which is mounted to a lower surface of the handle. Reel 55 may be of any suitable design, and preferably is a spinning type reel.

As shown in FIG. 1, rod 50 includes a plurality of annular ring-shaped fishing line guides, which are referred to variously as guides, eyes, or rings, which protrude downwardly from a lower side of shaft 52. The eyes preferably include a downwardly and forwardly angled tip eye 56 located at the outer, narrow end of shaft 52, at least one intermediate eye 57 located rearwards of the tip eye, and at least one rear eye 58 located longitudinally rearwards of the intermediate eye. Although the precise spacing between eyes 56, 57 and 58 is not critical, intermediate eye 57 would typically be located about ⅔ of the distance between rear eye 58 and tip eye 56.

While tip eye 56 and intermediate eye 57 typically would have about the same diameter, rear eye would be larger in diameter, e.g., by a factor of two.

As may be understood by referring to FIG. 1, the function of line eyes 56, 57, 58 is to slidably support a fishing line 59 which protrudes forward through an aperture 60 in a front bulkhead wall 61 of reel 55. Line 59 is wrapped around a rotatable spool 62 (not shown) inside a housing 63 of reel 55, and secured to the spool. A free end 64 of line 59 is threaded through central apertures 65, 66, 67 of eyes 56, 57, 58, and attached to a lure or bait 68 which has protruding therefrom at least one barbed hook 69.

As shown in FIGS. 1-5, rod 50 includes a U-shaped sling support yoke 70 which protrudes upwardly from an upper surface 71 of shaft 52, at a location, preferably longitudinally adjustable, between rear eye 58 and front transverse end wall 53 of handle 51.

As shown in FIGS. 2, 3 and 7-9, sling support yoke 70 has a base bar 72 which is disposed transversely to the longitudinal axis of shaft 52, and left and right upright arms 73, 74 which protrude upwardly from opposite left and right sides 75, 76 of the base bar. Upright arms 73, 74 are spaced equidistant from a vertical central plane of yoke 70, and from the longitudinal axis of shaft 52. Although the exact shapes of yoke base bar 72 and arms 73, 74 are not critical, a preferred shape is that of a unitary, arcuately curved, rectangular cross-section bar. Yoke 70 is preferably made pf a strong, flexible material such as fiberglass.

As shown in FIGS. 3-5, yoke 70 is longitudinally slidably mounted on rod shaft 52 by means of a releasable clamp assembly 77.

Figure 8:
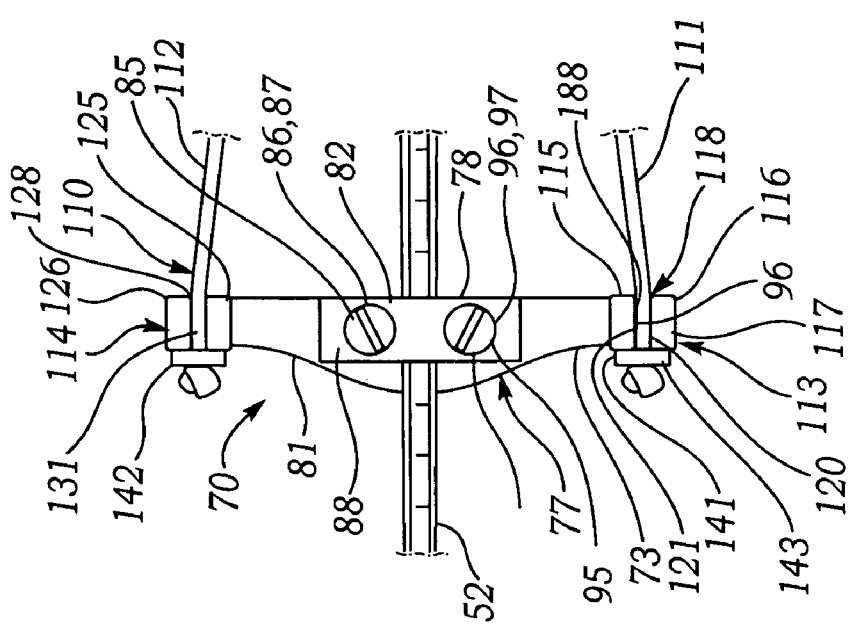
FIG. 8 is an upper plan view of the sling yoke of FIG. 7.
Figure 7:
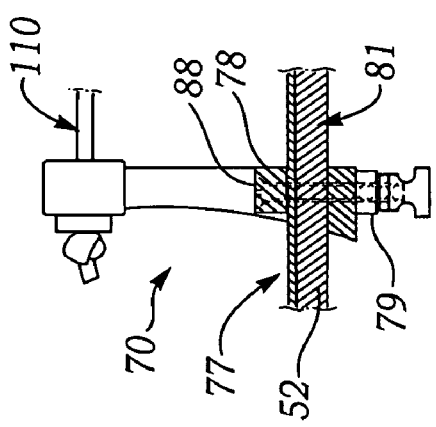
FIG. 7 is a fragmentary transverse sectional view of the rod of FIG. 1, taken in the direction of line 7-7 and showing a sling yoke thereof.

As may be seen best by referring to FIGS. 7-9 in addition to FIGS. 1-6, clamp assembly 77 includes upper and lower clamp members 78, 79 which contact upper and lower surfaces 71,81, respectively, of rod shaft 52. Thus, as shown in FIG. 2, upper clamp member 78 consists of a laterally disposed, rectangular cross section clamp bar, positioned above rod shaft 52. Lower clamp member 79 consists of a laterally disposed, rectangular cross section bar of similar size and shape to upper clamp bar 78, which is attached to lower surface 84 of yoke base bar 72, in vertical alignment with upper clamp bar 78.

Upper clamp bar 78 is secured to lower clamp bar 79 by vertically disposed members located on left and right sides of shaft 52. Thus, as shown in FIG. 3, a first, right-hand vertical fastener member located on one side of shaft 52, e.g., the right side, consists of a flat head screw 85 which has a tapered conically-shaped head 86 that is seated in a conically-shaped countersink 87 formed in the upper surface 88 of upper clamp bar 78, the threaded shank 89 of the screw being disposed downwards through a bore 90 disposed vertically through the right-hand side of upper clamp bar member 78. A lower end portion of shank 89 extends through a hole 91 disposed vertically through a right-hand side base bar 72 of yoke 70, and is tightened into a threaded bore 92 disposed vertically through a right-hand side portion of lower clamp bar 79.

Clamp assembly 77 also includes on the left side thereof, at an equal distance from the longitudinal center line of shaft 52, a second, left-hand flat head screw 95 which is disposed parallel to right-hand screw 85. Left-hand screw 95 has a tapered conically-shaped head 96 that is seated in a conically-shaped countersink 97 formed in the upper surface 88 of upper clamp bar 78. The threaded shank 99 of left-hand screw 95 is disposed downwards through a bore 100 disposed vertically through the left-hand side of upper clamp bar member 78. A lower end portion of shank 99 of left-hand screw 95 extends through a hole 100 disposed vertically through a left-hand side of base bar 72 of yoke 70. Shank 99 protrudes from hole 100 and through a vertically aligned through-hole 102 which is disposed vertically through a left-hand side portion of the lower clamp bar 79.

Shank 99 of left-hand clamp screw 95 protrudes through hole 102 outwardly of the lower surface 103 of lower clamp bar 79, where its threaded lower end threadingly receives a knurled thumb nut 104. Tightening thumb nut 104 on shank 99 of screw 95 draws upper and lower clamp bars 78 and 79 together, thus exerting a compressive clamping force on the rod shaft 52, an upper surface 71 of which is seated in a centrally located longitudinally disposed groove 106 located in the lower surface 107 of upper clamp bar 78. Lower surface 81 of shaft 52 is, seated on a resilient pad 109 attached to the upper surface 110 of yoke base bar 72. With the foregoing construction, clamp nut 104 is loosenable to enable yoke 70 to be slid to a selected longitudinal position on shaft 52, whereupon the clamp nut is tightenable to secure clamp assembly 77 and yoke 70 to the shaft at the selected longitudinal position.

As shown in FIG. 4, a distance scale 168 imprinted with transversely disposed, longitudinally spaced apart indicia 169 is preferably affixed to upper surface 71 of shaft 52 between front transverse end wall 53 of handle 51 and rear line guide eye 58 along which yoke 70 is intended to be positioned. The function of distance scale 168 is described below.

As may be seen best by referring to FIGS. 1-6, 17A and 19, rod 50 includes an elastic sling 110 which comprises an elongated elastic cord formed into a half loop which has generally longitudinally disposed left and right side segments 111, 112 that are attached at front, free ends 111A, 112A thereof to the upper ends 113, 114 left and right of yoke arms 73, 74. As shown in those figures, the upper ends 113, 114 are bifurcated into parallel, vertically disposed, generally rectangularly-shaped opposed inner and outer jaws 115, 116 and 125, 126, respectively. Thus constructed, the upper end 113 of left-hand arm 73 has protruding downwardly from an upper horizontal end wall 117 thereof a relatively deep, rectangular cross-section open channel or notch 118, which has confronting inner facing wall surfaces 119, 120 of inner and outer jaws 115, 116, respectively. Preferably, at least one interior jaw surface, such as that of inner jaw 115, has protruding therefrom an outwardly and downwardly angled sling retention barb 121.

Similarly, the upper end 114 of right-hand yoke arm 74 has protruding downwardly from an upper horizontal end wall 127 thereof a relatively deep, rectangular cross-section open channel or notch 128, which has confronting inner facing wall surfaces 129, 130 of inner and outer jaws 125, 126, respectively. Preferably, at least one interior jaw surface, such as that of inner jaw 125, has protruding therefrom an outwardly and downwardly angled sling retention barb 131.

As may be seen best by referring to FIGS. 2-6 and 8, sling 110 has fitted coaxially over outer ends 111A, 112A thereof retainer washers 141, 142, which are prevented from slipping off the ends of the sling by an enlargement such as knot 143, 144 formed in the ends of the sling. Retainer washers 141, 142 have larger diameters than the width of notches channels 118, 128 in the upper ends of yoke arms 73, 74, so that when ends 111A, 112A of sling 110 are forced downwards into the notched channels, left and right side segments 111, 112 of the sling are anchored against rearward movement by washers 141, 142, and against vertical movement out from the channels by channel barbs 121, 131. The lateral spacing between opposed jaw pairs 115, 116 and 125, 126 which are preferably made of strong, elastically deformable material such as fiber-glass or metal, is slightly less than the diameter of elastic sling cord 110, so that the jaws will exert a resilient, compressive restraining force on the sling.

Referring to FIGS. 4 and 6, it may be seen that side segments 111, 112 of the length of sling 110 between front ends 111A, 112A thereof are disposed rearwardly from yoke 70 to form a half loop which is attached to a generally, flat laterally symmetrically-shaped bait launcher plate 150. Bait launcher plate 150 is secured to sling 110 by any suitable means. In a preferred embodiment, as shown in FIGS. 4-6, bait launcher plate 150 has protruding from opposite, left and right longitudinally disposed edges 151, 152 thereof longitudinally disposed, cylindrically-shaped ferrules 153, 154 which have therethrough longitudinally disposed bores 155, 156 which receive therethrough left and right trailing segments 111, 112 of sling 110. A looped center part 159 of sling 110 is disposed laterally through the bore 160 of an anchor tube 161 which protrudes downwardly from the lower surface 162 of bait launcher plate 150.

As shown in FIGS. 4 and 6, bait launcher plate 150 has formed in a front edge wall 163 thereof at least one V-shaped bait attachment groove 164, the function of which is described below. As is also shown in FIGS. 4 and 6, bait launcher plate 150 has a tab portion 166 which protrudes rearwardly of sling anchor tube 161, and has through its thickness dimension a laterally symmetrically located anchor pin engagement hole 167, the function of which is also described below.

Sling 110 is made of a strong elastic cord, such as neoprene surgical tubing having an outer diameter of about 0.218 inch and a wall thickness of about 0.060 inch.

FIGS. 10 through 16 illustrate a modification 170 of sling support yoke 70. Modified yoke 170 is similar in construction and function to yoke 170, but has a modified clamp assembly 177. Thus, modified sling support yoke 170 has a laterally disposed base bar 172 and left and right upright arms 173, 174, all shaped similarly to corresponding elements of yoke 70.

Base bar 172 of modified yoke 170 has formed in a lower wall surface 175 thereof an inverted V-shaped groove 211 of an appropriate size to receive coaxially therein shaft 52 of rod 50. In a preferred embodiment, modified yoke 170 comprises a unitary arcuately curved, rectangular cross-section bar, in which case groove 211 is formed by left and right upwardly and downwardly angled portions 212, 213 of base bar 172.

Clamp assembly 177 of modified yoke 170 includes a lower clamp member 179 which comprises a laterally disposed, rectangular cross-section bar that is pivotably attached to a pivot lug 184 which protrudes downwardly from a lower surface 175 of base bar 172, laterally offset to one side, e.g., the right side of base bar 172.

As shown in FIG. 14, clamp bar 179 has formed in left and right longitudinally disposed edges 186, 187 thereof, U-shaped notches 188, 189, respectively. Right-hand notch 189 forms on opposite front and rear laterally disposed sides thereof front and rear opposed arms 190, 191 that have disposed longitudinally therewithin front and rear longitudinally aligned pivot pin holes 192, 193. The latter receive a pivot pin 194 that is disposed through an aligned hole 195 through pivot lug 184.

Clamp assembly 177 of modified yoke 170 includes a vertically disposed threaded clamp stud 196 which is threadingly received in a threaded bore 197 disposed vertically through a left-hand side 198 of base bar 172, laterally outwards of shaft receipt groove 211 in the lower surface of the base bar.

As shown in FIGS. 10 and 11, clamp stud 196 protrudes vertically downwards below the lower surface 175 of the base bar 172 and is received through left-hand notch 188 in clamp bar 179. A thumb screw 201 is threadingly tightened onto that portion of clamp stud 196 protruding below lower surface 202 of clamp bar 179, to draw upper surface 203 of the clamp bar towards lower surface 175 bf the yoke base bar, to thereby exert a compressive clamping force on shaft 52 of rod 50. Preferably, clamp assembly 177 includes a cushioning seat between upper surface 203 of clamp bar 179, and the lower surface of rod shaft 52. Thus, as shown in FIGS. 10 and 13-16, clamp bar 179 has a hollow cylindrical boss 204 which protrudes downwardly from lower surface 202 of the clamp bar. A blind bore 206 extends coaxially downwards into boss 204 from upper surface 203 of the clamp bar. Bore 206 holds coaxially therein a flanged, cylindrically-shaped plastic pin 207 which is biased resiliently upwards by a compressive spring 208. The upper, outer annular ring-shaped flange 209 of pin 207 serves as a resilient seat for lower surface 81 of shaft 52 of rod 50.

As shown in FIG. 10, clamp stud 196 preferably has fitted coaxially thereon a rubber washer 210 located between the upper surface 203 of clamp bar 179 and the lower surface 175 of the yoke base bar 172, and a metal washer 205 located between thumb screw 201 and the lower surface 202 of the clamp bar.

The fishing rod 50 with elastic sling launcher according to the present invention includes a bait launching mechanism 220 attached to handle 51. As shown in FIGS. 17A and 18, the bait launching mechanism 220 includes a thin, longitudinally rectangular plate-shaped anchor bar 221 attached to the upper surface 222 of handle 51, as, for example by a pair of longitudinally spaced apart, laterally centered fore-and-aft screws 223, 224 which are disposed through-holes 225, 226 through the anchor bar, which is spaced above the upper surface of the handle by a pair of fore-and-aft spacer bushings 227, 228. Screws 223, 224 are received through bushings 227, 228 and tightened into threaded blind bores 229, 230 which extend downwards into the upper surface of the handle.

As shown in FIGS. 17A and 18, anchor bar 221 has protruding from upper surface 231 thereof, near front transversely disposed edge 232 thereof a laterally centrally located, cylindrically-shaped anchor pin 233, which preferably angles backwards at a small angle from a vertical line through the handle. As may be seen best by referring to FIGS. 20 and 24, anchor pin 233 is insertably received vertically upwards through anchor pin engagement hole 167 through rear anchor tab portion 166 of bait launcher plate 150.

Referring to FIGS. 1, 5, 17A, 17B and 20, bait launching mechanism 220 of rod 50 includes a bait support rocker platform 235 which overlies anchor bar 221 and is pivotably mounted to rod handle 51. As shown in FIGS. 17A and 17B, rocker platform 235 has generally the shape of an inverted three-sided, rectangular channel member, including an upper longitudinally elongated, rectangularly-shaped base plate 236 and left and right flange plates 237, 238 which depend downwardly from left and right longitudinally disposed edges 239, 240, respectively, of the base plate. Thus constructed, rocker platform has formed between the inner facing wall surfaces 241, 242, 243 of base plate 236 and left, upper and right rocker arm flange plates 237, 238, a longitudinally disposed, rectangularly-shaped open channel 244 which is of an appropriate size and shape to fit without interference over anchor bar 221.

As may be seen best by referring to FIG. 4, base plate 236 of rocker platform 235 has protruding rearwardly from a rectangular portion 287 thereof a laterally symmetrical ogival-shaped rear extension 286, which serves as a thumb-operable trigger plate, as shown in FIGS. 21-25.

As may be best understood by referring to FIGS. 5, 17A and 25 rocker platform 235 is pivotably mounted to handle 51, over anchor bar 221, by a pair of laterally disposed and aligned, left and right pivot bolts 246, 247 which extend through left and right laterally disposed aligned pivot mounting holes 248, 249, the inner ends of bolts being secured in bushings 250, 251 which protrude from opposite vertical wall surfaces 252, 253 of the handle. Optionally, bolts 246, 247 may be replaced by a single pivot axle screw 254 which is disposed through bushings 250, 251' and through a transversely disposed connecting bore 255 which extends through the width of handle 51, the screw being secured with a nut 256 located adjacent to an outer surface of a side panel 237 or 238 opposite to where a head 258 of screw 254 is located.

As shown in FIGS. 1, 5 and 16, left and right flange plates 237, 238 which depend perpendicularly downwards from rocker platform upper base plate 236 preferably have in side elevation view a shape approximating that of an inverted isosceles triangle whose base corresponds to an upper longitudinally disposed edge 239, 240, respectively, of the upper base plate. Left side flange plate 237 has a front downwardly and rearwardly angled side 259, a longitudinally vertically located, arcuately truncated vertex 260, and a rear upwardly and rearwardly angled side 261. Right side flange 238 has a shape similar to that of left side flange plate 237, including an a front downwardly and rearwardly angled side edge 262, vertex 263, and rear upwardly and rearwardly angled side edge 264.

As shown in FIG. 17B, upper base plate 236 of rocker platform 235 has cut rearwards into front transverse edge wall 265 thereof a laterally centrally located, longitudinally disposed U-shaped notch 266. As shown in FIGS. 4 and 5, notch 266 provides clearance for anchor pin 233 protruding upwards from anchor bar 221, and enables a front portion of rocker platform base plate 236 to be pivoted upwards sufficiently for the upper surface 267 of the base plate to be elevated to the same height as the upper transverse end face 268 of anchor pin 233, thus pushing launching plate 150 upwards sufficiently far for the anchor pin to withdraw from engagement within anchor hole 167 through launcher plate anchor tab 166, thereby releasing the launching plate and allowing elastic sling 110 to propel the launching plate forward, as shown in FIG. 25.

As shown in FIGS. 1-5, 17A, 17B and 17C, bait launching mechanism 220 of rod 50 preferably includes a bait launching support tray 270 attached to the upper surface 267 of rocker arm base plate 236. The purpose of bait launching support tray 270 is to provide a tray-like support for holding a slack length of fishing line 59 attached to a bait 60, as shown in FIG. 19, along with various bait attachments and accessories such as spinners, swivels, snaps and the like.

As may be seen best by referring to FIGS. 2, 4 and 17C, a basic embodiment of a bait launching support tray 270 includes a flat longitudinally elongated, rectangularly-shaped base plate 272, of approximately the same size and shape as that of the rectangular front portion of upper base plate 236 of rocker platform 235. The bait launching support tray 270 has a pair of flat, laterally opposed left and right side wings 273, 274 which depend upwardly from left and right longitudinally disposed side edges 275, 276 of tray base plate 272, preferably at a slight laterally outward angle. The front portions 277, 278 of side wings 273, 274 preferably have a longitudinally elongated rectangular shape, with horizontally disposed upper edge walls 279, 280. Preferably rear portions 281, 282 of the side wings have arcuately downwardly curved rear edges 283, 284 which terminate at lower ends thereof at a rear transverse edge wall 285 of bait launching tray base plate 272. The curved rear edge walls 283, 284 result in a clearance space for a thumb to depress an ogival-shaped rear trigger plate 286 of rocker platform base plate 236 which protrudes rearwards from a front rectangular portion 287 of the rocker platform base plate, as shown in FIGS. 21-25.

Preferably, rocker platform 235 is constructed so as to enable bait launcher tray 270 to be removably attachable to the rocker platform, thus enabling different types of bait launcher trays to be interchangeably mounted onto the rocker platform. Thus, as shown in FIGS. 17A-17B, base plate 236 of rocker arm platform 235 has fastened to lower surface 241 thereof a pair of front and rear longitudinally aligned, laterally centrally located fasteners 289, 290. At least one of the fasteners 289, 290, e.g., rear fastener 290, is constructed so as to be able to secure lower surface 291 of base plate 272 of bait launcher support tray 270 tightly to upper surface 267 of rocker platform base plate 236. Thus, as shown in FIGS. 17A and 17B, rear rocker platform base plate fastener 290 comprises a nut plate 293 which is fastened to lower surface 241 of rocker platform base plate 236. Nut plate 293 has through its thickness dimension a threaded bore 294 which is vertically aligned with a bore 295 through the thickness dimension of upper base plate 236 of rocker platform 235. Threaded bore 294 of nut plate 293 is adapted to threadingly receive a headed screw 296 inserted downwardly through a bore 297 provided through the thickness dimension of base plate 272 of bait launching support tray 270, as shown in FIG. 17A.

Front rocker platform fastener 289 may have the same construction as rear fastener 290. Optionally, as shown in FIGS. 17A and 17B, front rocker platform fastener 290 comprises a pin 298 which protrudes upwardly from a retainer plate 299 fastened to the lower surface of the rocker platform base plate 236, the pin protruding upwardly through a hole 300 through the thickness dimension of the rocker arm base plate, and through a locating or index hole 301 provided through the thickness dimension of base plate 272 of bait launching support tray 270.

As may be understood by referring to FIGS. 4, 17A, 17B and 17C, a front transverse edge wall 302 of bait launching support tray base plate 272 has cut rearwards there into a laterally centrally located, longitudinally disposed, U-shaped notch 303. As shown in those figures, notch 303 is similar in size, shape and location to notch 266 in front transverse edge wall 265 of rocker platform upper base plate 236, and congruently aligned with the rocker platform notch when base plate 272 of the bait launching tray is fastened in parallel overlying contact of the upper surface of the rocker platform upper base plate. Thus shaped and located, notch 303 of bait launching support tray 270 cooperates with notch 266 in rocker platform 235 to provide clearance for anchor pin 234 protruding upwards from anchor bar 221, as shown in FIGS. 4, 5 and 23-25, thus enabling pivotable motion of the bait support tray as well as that of the rocker platform, as described above.

FIGS. 5, 17A and 20 illustrate a safety lock mechanism 310 which preferably is included in rod 50, to prevent inadvertent launching of a bait. As shown in FIGS. 5, 17A and 20, safety lock mechanism 310 includes a safety lock switch 311. Safety lock switch 311 comprises a flat, vertically disposed rectangular plate-like pivot arm 312 which is pivotably mounted to a side, e.g., the left side of rod handle 51 by a pivot screw 313. Pivot screw 313 has a shank 314 disposed perpendicularly through a clearance hole 315 of larger diameter than the shank provided through a bottom central portion of pivot arm 312.

An inner end of pivot screw shank 314 is secured in a threaded bore 316 disposed perpendicularly into a left side 252 of handle 51.

As shown in FIG. 5, safety lock switch pivot arm 312 has protruding perpendicularly outwards from a front upper corner region 318 of pivot arm 312 a horizontally disposed, cylindrically shaped locking pin 319. With pivot arm 312 pivoted forwards in a counterclockwise sense, locking pin 319 of the pivot arm lodges in a vertex 320 of a rectangularly-shaped notch 321 cut in rear diagonal edge wall 261 of left side flange plate 237 of rocker platform 235. Vertex 320 is located at the intersection of a short vertical front edge wall 322 and an upper longitudinally disposed edge wall 323 of notch 321.

As may be understood by referring to FIGS. 5, 17A and 18, pivot arm 312 of safety lock switch 311 is biased to a counterclockwise forward position in which locking pin 319 is lodged in notch 321 of rocker arm left side flange plate 237 by a resilient force producing element, such as a tension spring, or as shown in the figures, an elastic tension cord 324. Tension cord 324 has secured to a front end thereof a front attachment eye 325, and to a rear wall thereof a rear attachment eyelet 326. Front attachment eyelet 325 is secured to the upper surface 231 of anchor bar 221 by any suitable means, such as a pin 328 which protrudes upwardly from the anchor bar and is received through the opening 329 through the front eyelet. Rear attachment eyelet 326 is attached to an inner end portion 330 of locking pin 319 which protrudes inwardly of inner vertical surface 331 of pivot arm 312 by any suitable means, such as groove 332 formed in the inner end of the locking pin which rotatably receives the inner circumferential end wall 333 of an aperture 334 through the rear attachment eyelet.

FIGS. 1 and 19-25 illustrate the operation of fishing rod 50, including the operation of safety lock mechanism 310.

First, as shown in FIGS. 3 and 19, thumb nut 104 of yoke clamp assembly 77 is loosened, and yoke 70 is slid along shaft 52 of rod 50 to a desired longitudinal position, as indicated by alignment of an index pointer 335 imprinted on the rear surface 336 of upper clamp assembly bar 78, with a selected indicia mark 169 on the rod shaft, corresponding to a desired bait launch distance. Clamp assembly thumb nut 104 is then tightened to secure yoke 70 at the selected position.

Next, anchor plate 150 is grasped, and used to draw sling rearwards from yoke 70, sufficiently far for anchor pin engagement hole 167 of rear tab portion 166 of the anchor plate to be vertically aligned with anchor pin 233, which protrudes upwardly from bait launcher support tray 270 and rocker platform 235, whereupon the anchor plate is pushed downwards to insertably receive the anchor pin upwardly through the anchor pin hole.

Referring to FIG. 1, bait 68 is grasped and pulled along with attached fishing line 59 clockwise over rod tip eye 54. Then, as shown in FIG. 19, the inner concave portion of bend 340 in hook 69 of bait 68 is engaged with V-shaped groove 164 in front edge wall 163 of launching plate 150. As shown in FIGS. 19 and 20, eye 341 of hook 69, and bait 68, and upper end 64 of line 59 attached to bait eye 342 are longitudinally aligned and disposed rearwards over bait launcher plate 150, and placed on upper surface 343 of bait launcher tray 270.

As shown in FIG. 20, after sling 110 has been tensioned to an armed position by anchor launcher plate 150 on anchor pin 233, and bait 68 has been hooked onto the launching plate, handle 51 of rod 50 is grasped in the hand of a fisherman. In a preferred mode of operation of rod 50, rod handle 51 is grasped in the palm of the fisherman's hand, with the thumb resting on trigger plate 286. Also, in a preferred operating mode of rod 50, a finger of the fisherman is positioned below a spool lock release lever 344 of reel 55, which is operated by a finger to release the spool and allow line to be drawn from the reel, prior to launching bait 68.

As shown in FIGS. 22 and 23, launching of bait 68 requires that locking pin 319 of safety lock lever arm 312 be operated by the other hand of the fisherman, requiring, as a safety feature, that both hands be used to launch a bait. Thus, as shown in FIGS. 22 and 23, the other hand of a person is used to pivot the safety lock switch locking arm clockwise (rearwards) to disengage locking pin 319 from notch 321 of rocker platform left side flange plate 237.

With safety lock switch lever 312 pivoted clockwise to a ready-to-fire position, as shown in FIG. 24, trigger plate 286 is depressed by the fisherman's thumb, as shown in FIG. 25. Depressing tightening plate 286 causes those portions of rocker platform 235 and bait launcher tray 270 rearward of rocker platform pivot axle 254 to pivot downwardly with respect to handle 51 and anchor bar 221. Conversely, those portions of rocker platform 235 and bait launcher tray 270 forward of pivot axle 254 are pivoted upwardly, thus elevating the front end of bait launcher tray base plate 272 and rocker platform base plate 236 above upper end 268 of anchor pin 233 of anchor bar 221. This upward elevation of the base plates of the rocker platform and bait launcher tray above the upper end of the anchor pin in turn causes anchor tab 166 of bait launcher plate 150 to be lifted off of engagement of anchor pin 233 in launching plate anchor hole 167. Thus released, bait launcher plate 150 is propelled forward by tension in sling 110, pulling bait 68 and attached line 59 forward behind the bait launcher plate.

As shown in FIG. 25, motion of bait launcher plate and sling 110 forwards of sling yoke 76 is restrained by rearward tension in the cord. When forward motion of the bait launching plate at the forward distance limit determined by the length of sling 110 forward of sling yoke 170, forward momentum previously imparted to bait 68 causes the bait to be propelled forward a substantial distance.

FIGS. 26-28 illustrate a first modified bait holder tray 370 for use with rod 50. Modified bait launching support tray 370 is adapted for use with sticky baits such as artificial worms made of a rubbery polymer which contains a large percentage of a plasticizer. Such baits tend to stick to flat surfaces on which they are supported, such as upper surface 343 of bait launcher support tray 270, thus making such launches impractical. To overcome this problem, modified bait launcher support tray 370, shown in FIGS. 2, 26-28, utilizes a plurality of cylindrical rollers to rollably support a sticky bait, such as an artificial worm W made of a rubbery material, as shown in FIGS. 27 and 28.

As shown in FIGS. 26-28, roller bait launch support tray 370 includes a longitudinally elongated, rectangularly-shaped base plate 372. Base plate 372 has a shape and size similar to that of base plate 272 of the basic, trough-shaped bait launch support tray 270 described above, and is provided with similar fasteners for releasably fastening the base plate to upper base plate 236 of rocker platform 235.

As shown in FIGS. 26 and 27A, roller bait launch support tray 370 has a pair of flat, laterally opposed left and right side panels 373, 374 which depend perpendicularly upwards from left and right longitudinally disposed side edges 375, 376 of tray base plate 372. As shown in FIGS. 27A and 27B, left and right side panels 373, 374 each have in side elevation view the appearance of a pair of parallel, laterally spaced apart similar wedge-like shapes which have short front edge walls 377, 378, and straight rearwardly and upwardly angled oblique upper edge walls 379, 380, respectively. Left and right side panels 373, 374 also have vertically disposed rear edge walls 381, 382, and, extending obliquely upwardly and rearwardly therefrom, short rectangular bar-shaped, cantilevered arm extensions 383, 384, respectively. The latter have upper oblique edge walls 385, 386 which are continuing extensions of upper oblique edge walls 379, 380, rounded rear edge walls 387, 388, and lower downwardly and forwardly angled oblique edge walls 389, 390. The latter are parallel to upper edge walls 385, 386 of the arm extensions, and terminate at lower ends thereof with rear vertical walls 389A, 390A, respectively.

As shown in FIGS. 26 and 27, roller bait launch support tray 370 has disposed transversely between inner facing vertical wall surfaces 391, 392 of left and right side panels 373, 374 thereof, a plurality of longitudinally spaced apart, transversely disposed roller axle bolts on which are rotatably mounted cylindrically-shaped plastic rollers. Although the exact number of axles and rollers is not critical, example roller bait launch support tray 370 shown in FIGS. 25 and 26 has a first, front axle bolt 393 which is disposed through a front mounting hole 394 located in left side panel 373 a short distance above the upper surface of base plate 372 and a short distance rearward of front edge wall 377 thereof. Front roller axle bolt 393 is disposed transversely through a transversely aligned hole 395 through right side panel 374, and is secured thereat by a nut 396, after a hollow cylindrical plastic roller 397 made of nylon, TEFLON or similar material is slipped over the shank of bolt 393. As shown in FIG. 26, the length of roller 397 is slightly less than the spacing between inner vertical wall surfaces 391, 392 of side panels 373, 374. Also, the bore 398 through roller 397 is of slightly larger diameter than that of shank 398 of bait 393. Thus arranged, roller 397 is freely rotatably on the shank 399 of bolt 393 in response to a torque exerted on the roller, as by a frictional tangential force exerted on the roller by a sticky bait being drawn longitudinally across the roller upon being launched.

As shown in FIGS. 26 and 27, roller bait launch support tray 270 preferably includes a second lower roller 397B spaced rearwards a first distance from front roller 397, and a third roller 397C spaced rearward the same distance from the second roller. Also, roller bait launch support tray 370 has a fourth, upper roller 397D disposed between cantilevered arm extension 383, 384, near rounded rear edge walls 387, 388 thereof.

Constructed as described above and shown in FIGS. 26 and 27, roller bait launch support tray 370 enables a sticky bait such as the elongated artificial worm W shown in FIGS. 27B and 28 to be rapidly accelerated when sling 110 is released, owing to the fact that the contact area of each roller 397 with the lower surface of the bait is sufficient to cause the roller to rotate in response to forward motion of the bait, but small enough to ensure that negligible retarding friction will be exerted on the bait.

FIGS. 29-31 illustrate a dual bait launch accessory 440 for use with rod 50, which includes a modified launch plate 450 and a modified dual launch bait tray 470. Dual bait launch accessory 440 is useful for launching bait configurations which have two components, such as a hooked bait attached to the end of fishing line, and a sinker attached to the line at some distance forward of the end of the line.

As shown in FIG. 29, modified, dual bait launching plate 450 is similar in construction to that of the basic bait launching plate 150 described above. However, dual launch plate 450 has a more generally rectangular shape, and has formed in the front edge wall 463 thereof a pair of left and right, similarly shaped V-shaped grooves 464 and 465 which are spaced equidistant from a laterally centrally located longitudinal center line of the launching plate.

As shown in FIGS. 29-31, bait launch support tray 470 of dual bait launch accessory 440 includes a longitudinally elongated, rectangularly-shaped base plate 472. Base plate 472 has a shape and size similar to that of base plate 272 of the basic, trough-shaped bait launch support tray 270 described above, and is provided with similar fasteners for releasably fastening the base plate to upper base plate 236 of rocker platform 235.

Figure 32:
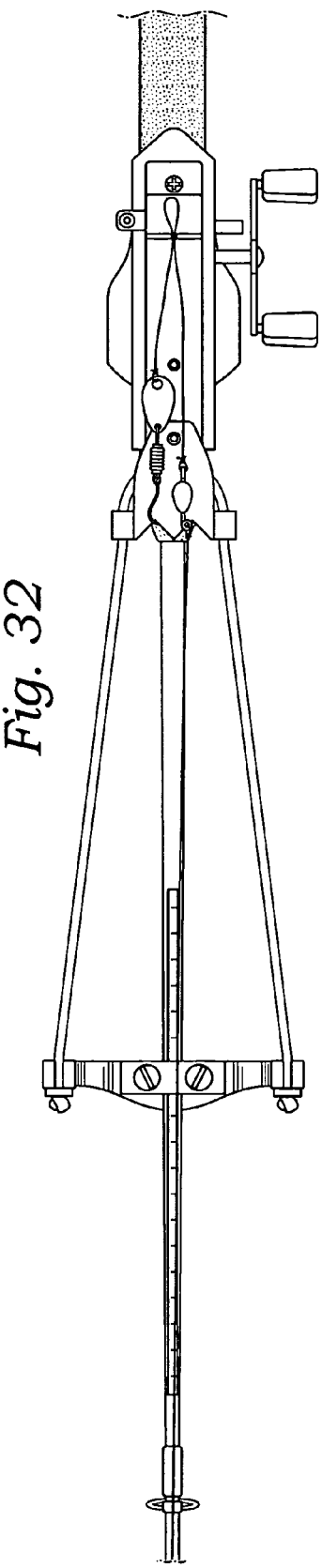
FIG. 32 is a perspective view of the rod of FIGS. 29-31, showing the rod being used to launch a bait.
Figure 33:
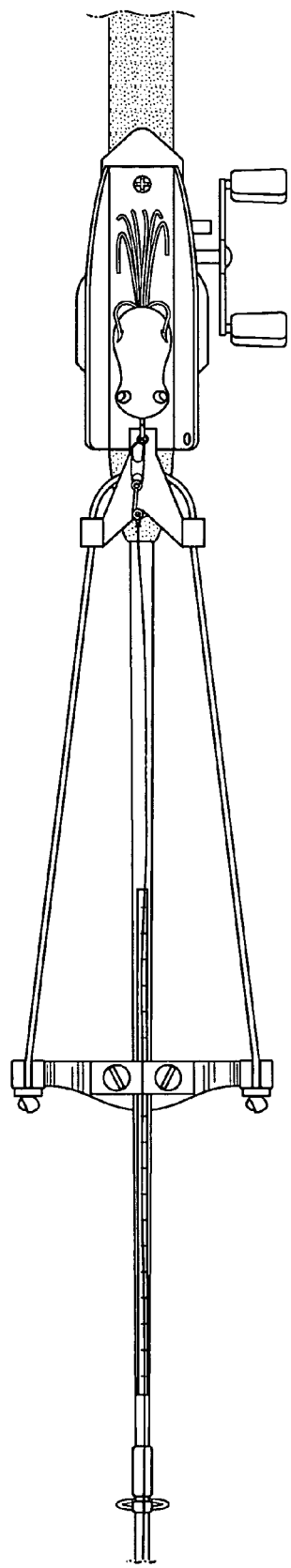
FIG. 33 is an upper perspective view showing the rod of FIG. 4 prepared to launch a hard bait provided with weedless, shrouded hooks, in which a hard bait launch clip of the invention engages a V-notch of the launch plate.

As shown in FIGS. 29 and 30, dual bait launch support tray 470 has protruding perpendicularly upwardly from upper surface 473 of base plate 472 thereof, a thin, transversely disposed line holder plate 474. Line holder plate 474 is made of a resilient material such as rubber. As shown in FIG. 31, line holder plate 474 has a generally rectangular outline shape in front and rear elevation views, including left and right vertical edge walls 475, 476. Line holder plate 474 has through its thickness dimension between front and rear parallel walls 477, 478 thereof a thin, laterally centrally located vertically disposed slit 479 cut perpendicularly downwards from the upper transverse edge wall 480 of the line holder plate. Slit 479 is adapted to receive and resiliently but loosely hold a looped length of fishing line 59, as shown in FIG. 32. Preferably, upper edge wall 480 of line holder plate 474 has formed therein a V-shaped notch 481 which has a vertex 482 that terminates at the upper end of the upper opening 483 of slit 479.

FIG. 32 illustrates the manner of using dual bait launch accessory 440. As shown in FIG. 32, the dual bait launch accessory is used by engaging the bend of a bait hook in one of the two V-shaped launching plates grooves, and a clip attached to a weight such as a clip shot within the other grooves. A length of line or leader between the bait eye and the weight is then drawn rearwards into a half loop, and the half loop pulled down into line holder groove. With this arrangement, when the launcher plate is released from the trigger mechanism in the manner described above for operation of the single groove launcher plate, the bait, weight, and interconnected leader or line are all launched forwards simultaneously.

Optionally, the line-holder plate is mounted to the base of the dual launcher plate in a manner which enables the longitudinal position of the line holder plate to be adjusted to accommodate different lengths of line or leader between a bait and weight.

Modifications of bait launcher plates 150 and 450 include making at least part of the plates of a permanent magnetic material, so that a ferromagnetic bait hook is releasably attachable to a launcher plate via a magnetic attraction force.

What is claimed is:

1. A fishing rod for propelling a bait from said rod, said rod comprising;
   a. a handle,
   b. an elongated shaft protruding forward from said handle,
   c. an elastic member adapted to exert a forwardly directed elastic restoration force in reaction to a rearwardly directed tensioning extensional force exerted on said elastic member,
   d. an elastic member support for securing said elastic member to said shaft of said rod,
   e. a bait launcher plate attached to a rearwardly tensionable portion of said elastic member, said bait launcher plate being adapted to exert a forwardly directed force on a bait, and
   f. a bait launching mechanism attached to said handle of said rod, said bait launching mechanism being adapted to releasably secure said launcher plate with said elastic member in a rearwardly tensioned position relative to said elastic member support and being actuateable to release said launching plate, thereby enabling elastic tension in said elastic member to propel forwards from said handle said bait launcher plate and said bait, said bait launcher plate having extending downwardly from an upper edge of a front edge wall thereof at least a first laterally symmetrically-shaped groove for engaging a protrusion from a bait.

2. The fishing rod of claim 1 wherein said elastic member support is further described as being so constructed as to enable tensioned longitudinal distance between said elastic member support and said bait launcher to be adjusted, thereby enabling said bait launcher plate and bait attached thereto to have adjustable values of momentum imparted thereto, thus enabling a bait to be launched to adjustably different distances forward of said rod.

3. The fishing rod of claim 1 wherein said elastic member is further defined as being a tension spring.

4. The fishing rod of claim 1 wherein said elastic member is further defined as being a flexible elongated elastic cord.

5. The fishing rod of claim 4 wherein said elastic member support is further defined as being a yoke having a base and a pair of arms which protrude upwardly from said base on opposite lateral sides of said shaft.

6. The fishing rod of claim 5 further including a clamp assembly for securing said base of said yoke to said shaft of said rod at an adjustable longitudinal position relative to said bait launching mechanism.

7. The fishing rod of claim 5 wherein said elastic member is further defined as being an elastic cord having a first end fastened to a first arm of said yoke and being disposed rearwardly therefrom, and a second end segment fastened to said second arm and disposed rearwardly therefrom.

8. The fishing rod of claim 7 wherein said bait launcher plate is further defined as being attached to a center portion of a half loop formed by said first and second segments of said elastic cord.

9. The fishing rod of claim 8 wherein said bait launching mechanism is further defined as including a pivotable member attached to said handle of said rod, and an anchoring assembly for releasably anchoring said launcher plate to said pivotable member, said pivotable member being pivotable to release said bait launcher plate.

10. The fishing rod of claim 9 wherein said bait launcher plate is further defined as being provided with a first type of engagement member for releasably engagement with said pivotable bait launching mechanism.

11. The fishing rod of claim 10 wherein said pivotable member of said bait launching mechanism is further defined as being provided with a second type engagement member for releasable engagement with said first type engagement member of said launcher plate.

12. The fishing rod of claim 11 wherein at least one of said first and second engagement members is further defined as being a pin which protrudes from one of said pivotable bait launching mechanism and said bait launcher plate.

13. The fishing rod of claim 12 wherein at least one of said first and second engagement member is adapted to insertably receive said pin.

14. The fishing rod of claim 1 wherein said groove is further defined as being laterally centrally located with respect to longitudinal side edges of said launcher plate.

15. The fishing rod of claim 1 wherein said bait launcher plate is further defined as having a second laterally symmetrically-shaped, downwardly depending groove formed in a front edge wall thereof.

16. The fishing rod of claim 15 wherein said first and second grooves have vertices which are spaced equidistant from a longitudinal center line of said bait launcher plate.

17. A fishing rod for propelling a bait from said rod, said rod comprising;
   a. a handle,
   b. an elongated shaft protruding forward from said handle,
   c. at least a first, tip eye attached to an end of said shaft longitudinally spaced forward from said handle, said eye being adapted to slidably receive therethrough a fishing line, d. a fishing line holding mechanism for securing a first, proximal end of a fishing line to said rod,
e. an elastic member adapted to exert a forwardly directed elastic restoration force in reaction to a rearwardly directed tensioning extensional force exerted on said elastic member,
f. an elastic member support for securing said elastic member to said shaft of said rod,
g. a bait launcher plate attached to a rearwardly tensionable portion of said elastic member, said bait launcher plate being adapted to engage and exert a forwardly directed force on a bait attachable to a distal end of fishing line attached to said fishing line holding mechanism and threaded through said tip eye, and
h. a bait launching mechanism attached to said handle of said rod, said bait launching mechanism being adapted to releasably secure said bait launcher plate with said elastic member in a rearwardly tensioned position relative to said elastic member support and being actuateable to release said bait launcher plate, thereby enabling elastic tension in said elastic member to propel forwards from said bait launcher plate a bait engaged by said bait launcher plate, and said fishing line, said elastic member support including a yoke having a base and a pair of arms which protrude upwardly from said base on opposite lateral sides of said shaft, said elastic member including an elongated flexible tensioning element having a first end segment fastened to a first arm of said yoke and a second end segment fastened to a second arm of said yoke, said bait launcher plate being attached to a center portion of said tensioning element located between said first and said second ends of said tensioning element, said bait launching mechanism including in combination,
  (i) an anchor pin which protrudes upwards from a front portion of said handle,
  (ii) a rocker platform pivotably mounted to said handle by a pivot axle, said rocker arm platform having a longitudinally elongated base plate which has a front transversely disposed edge in which is formed a notch that receives upwardly therethrough an upper portion of said anchor pin, and a rear portion rearward of said pivot axle which has a trigger plate depressable to thereby pivot said rear part of said base plate downwards and said front part upwards sufficiently far to raise an upper surface of said base plate adjacent said notch to an elevation as high as that of an upper transverse end of said anchor pin, and
  (iii) an aperture through a thickness dimension of a rear, anchor tab portion of said bait launcher plate, said aperture adapted to receive said anchor pin and thereby releasably hold said bait launcher plate in a rearwardly tensioned position from said yoke, and to release said anchor tab of said bait launcher plate when said trigger plate is depressed sufficiently far downwardly.

18. The fishing rod of claim 17 wherein said flexible tensioning element is further defined as being a tension spring.

19. The fishing rod of claim 17 wherein said flexible tensioning element is further defined as being an elongated elastic cord.

20. The fishing rod of claim 17 further including a bait launch support tray adapted to hold bait components, line and bait accessories, said bait launch support tray having a base plate which overlies said rocker platform base plate, said bait launch support tray base plate having formed in a front edge wall thereof a notch which overlies said rocker platform base plate and receives upwardly therethrough an upper portion of said anchor pin.

21. The fishing rod of claim 20 wherein said bait launch support tray is further defined as including a pair of laterally opposed, longitudinally disposed left and right side wings which protrude upwardly of opposite longitudinally disposed sides of said bait launch support tray and form between inner facing surfaces thereof a longitudinally disposed channel.

22. The fishing rod of claim 20 wherein said bait launch support tray is further defined as including a pair of laterally opposed, longitudinally disposed left and right side panels which have disposed transversely between inner facing surfaces thereof a plurality of longitudinally spaced apart rollers.

23. The fishing rod of claim 20 wherein said bait launch support tray is further defined as including a transversely disposed line holder plate which protrudes upwardly from said base plate of said bait support tray, said line holder plate having through a thickness dimension thereof a thin, laterally centrally located vertically disposed slit which extends downwardly from an upper edge wall of said plate, said slit having opposed confronting walls for frictionally holding therebetween at least one of a fishing line and leader.

24. The fishing rod of claim 23 wherein said line holder plate is further defined as including an aid structure for facilitating insertion of a fishing line into said slit.

25. The fishing rod of claim 24 wherein said aid structure is further defined as being a generally V-shaped notch formed in an upper edge wall of said line holder plate, said notch having a vertex which terminates at an upper end of an opening to said slit.

26. The fishing rod of claim 17 wherein said bait launcher plate is further defined as formed in a front edge wall thereof at least a first groove for engaging a protrusion from a bait.

27. The fishing rod of claim 26 wherein groove is further defined as being laterally centrally located with respect to longitudinal side edges of said launcher plate.

28. The fishing rod of claim 26 wherein said bait launcher plate is further defined as having a second groove formed in a front edge wall thereof.

29. The fishing rod of claim 28 wherein said first and second grooves have rear vertices which are spaced equidistant from a longitudinal center line of said bait launcher plate.

30. The fishing rod of claim 17 wherein said rocker arm platform is further defined as having depending downwardly from opposite left and right longitudinally disposed side edges of said rocker platform base plate a pair of left and right side flange plates which form between inner facing vertical wall surfaces thereof, and with a lower wall surface of said base plate an inverted, generally rectangularly-shaped channel which fits pivotably over said handle.

31. The fishing rod of claim 17 further including a safety switch for minimizing inadvertent actuation of said rocker arm platform to launch a bait, said safety switch comprising in combination a notch formed in a rear edge wall of one of said flange plate, and a locking pin which protrudes laterally outwards from said handle and which is resiliently biased into engagement with a vertex of said slot, whereby said locking pin must be grasped with a second hand and pivoted rearwards to enable said rocker platform to be pivoted rearwardly to effect a launch.

* * * * *